(12) United States Patent
Cody et al.

(10) Patent No.: US 10,652,719 B2
(45) Date of Patent: May 12, 2020

(54) TOY VEHICLE ACCESSORY AND RELATED SYSTEM

(71) Applicant: Mattel, Inc., El Segundo, CA (US)

(72) Inventors: Gerry Cody, Los Angeles, CA (US); Ron Friedman, Los Angeles, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 16/170,145

(22) Filed: Oct. 25, 2018

(65) Prior Publication Data

US 2019/0297480 A1 Sep. 26, 2019

Related U.S. Application Data

(60) Provisional application No. 62/577,346, filed on Oct. 26, 2017.

(51) Int. Cl.
*H04W 4/80* (2018.01)
*A63H 17/26* (2006.01)

(52) U.S. Cl.
CPC .............. *H04W 4/80* (2018.02); *A63H 17/26* (2013.01); *A63H 2200/00* (2013.01)

(58) Field of Classification Search
CPC ............................ H01L 29/0646; H01L 21/76
See application file for complete search history.

(56) References Cited

U.S. PATENT DOCUMENTS

| | | |
|---|---|---|
| 4,449,114 A | 5/1984 | Fascenda |
| 4,925,424 A | 5/1990 | Takahashi |
| 5,420,903 A | 5/1995 | Newton |
| 5,435,553 A | 7/1995 | Arima |
| 5,666,101 A | 9/1997 | Cazzani |
| 6,012,957 A | 1/2000 | Cyrus |
| 6,908,066 B2 | 6/2005 | Koenig |
| 7,066,781 B2 | 6/2006 | Weston |
| 7,072,792 B2 | 7/2006 | Freifeld |
| 7,312,590 B1 | 12/2007 | Kovach, II et al. |
| 7,336,178 B2 | 2/2008 | Le |
| 7,339,478 B2 | 3/2008 | Le |
| 7,387,559 B2 * | 6/2008 | Sanchez-Castro ..... A63H 17/14 446/433 |
| 7,402,106 B2 | 7/2008 | Weisel, Jr. |
| 7,474,984 B2 | 1/2009 | Freifeld |
| 7,488,231 B2 | 2/2009 | Weston |
| 7,808,385 B2 | 10/2010 | Zheng |
| 7,880,413 B1 | 2/2011 | Kovach, II et al. |

(Continued)

FOREIGN PATENT DOCUMENTS

WO 2001033530 A1 5/2001

*Primary Examiner* — Tuan H Nguyen
(74) *Attorney, Agent, or Firm* — Edell, Shapiro & Finnan, LLC

(57) ABSTRACT

An improved toy system is disclosed herein. In one aspect, the toy system includes a toy vehicle that can be uniquely identified. The toy vehicle includes a wireless tag that contains identifying information that is unique to the toy vehicle. In another aspect, the system includes a toy vehicle reader that can identify a toy vehicle that is proximate to the reader. The toy vehicle reader can wirelessly communicate with the tag, and in particular with a chip on the tag, on the proximate toy vehicle. In one embodiment, the toy vehicle reader utilizes Near Field Communication (NFC) technology to read the tags on vehicles.

20 Claims, 34 Drawing Sheets

(56) References Cited

U.S. PATENT DOCUMENTS

| | | |
|---|---|---|
| 7,883,080 B2 | 2/2011 | Hoehle |
| 7,980,913 B1 | 7/2011 | D'Avanzo |
| 7,982,613 B2 | 7/2011 | Zheng |
| 8,013,550 B1 | 9/2011 | Young et al. |
| 8,030,871 B1 | 10/2011 | Young et al. |
| 8,145,448 B2 | 3/2012 | Vincenzini |
| 8,152,589 B2 | 4/2012 | Bowen |
| 8,154,227 B1 | 4/2012 | Young |
| 8,157,611 B2 | 4/2012 | Zheng |
| 8,216,036 B2 | 7/2012 | Eyzaguirre |
| 8,257,157 B2 | 9/2012 | Polchin |
| 8,287,327 B1 | 10/2012 | Ghaly |
| 8,353,737 B2 | 1/2013 | Sofman et al. |
| 8,469,766 B2 | 6/2013 | Zheng |
| 8,502,483 B2 | 8/2013 | Young et al. |
| 8,545,284 B2 | 10/2013 | Baarman et al. |
| 8,747,182 B2 | 6/2014 | Sofman et al. |
| 8,753,165 B2 | 6/2014 | Weston |
| 8,845,384 B2 | 9/2014 | Ghaly |
| 8,858,339 B2 | 10/2014 | Reiche |
| 8,882,560 B2 | 11/2014 | Sofman |
| 8,892,276 B1 | 11/2014 | Young et al. |
| 8,951,092 B2 | 2/2015 | Sofman et al. |
| 8,951,093 B2 | 2/2015 | Sofman et al. |
| 8,961,260 B2 | 2/2015 | Weston |
| 9,039,482 B2 | 5/2015 | Cohen |
| 9,067,145 B2 | 6/2015 | Sofman |
| 9,126,122 B2 | 9/2015 | Boeckle |
| 9,162,155 B2 | 10/2015 | Platzer |
| 9,168,464 B2 | 10/2015 | Karunaratne |
| 9,238,177 B2 | 1/2016 | Sofman et al. |
| 9,283,472 B2 | 3/2016 | Platzer |
| 9,320,976 B2 | 4/2016 | Weston |
| 9,320,978 B2 | 4/2016 | Musliner |
| 9,403,100 B2 | 8/2016 | Karunaratne |
| 9,446,316 B2 | 9/2016 | Reiche et al. |
| 9,480,929 B2 | 11/2016 | Weston |
| 9,486,702 B2 | 11/2016 | Reiche et al. |
| 9,550,129 B2 | 1/2017 | Nave |
| 9,555,338 B2 | 1/2017 | Karunaratne |
| 9,561,447 B2 | 2/2017 | Karunaratne |
| 9,649,565 B2 | 5/2017 | Leyland et al. |
| 9,694,296 B2 | 7/2017 | Sofman et al. |
| 9,763,307 B2 | 9/2017 | Aliakseyeu et al. |
| 9,802,126 B2 | 10/2017 | Reiche et al. |
| 9,802,135 B2 | 10/2017 | Caudill |
| 9,895,622 B2 | 2/2018 | Musliner |
| 9,901,838 B2 | 2/2018 | Baarman et al. |
| 9,914,055 B2 | 3/2018 | Reiche et al. |
| 9,931,578 B2 | 4/2018 | Weston |
| 9,937,430 B2 | 4/2018 | Kovach, II et al. |
| 9,937,431 B2 | 4/2018 | Kovach, II et al. |
| 9,950,271 B2 | 4/2018 | Sofman |
| 2004/0214642 A1 | 10/2004 | Beck |
| 2005/0148281 A1 | 7/2005 | Sanchez Castro |
| 2005/0287925 A1 | 12/2005 | Proch et al. |
| 2006/0084361 A1 | 4/2006 | Favorito |
| 2006/0087454 A1 | 4/2006 | Le |
| 2006/0148579 A1 | 7/2006 | Amaum Manresa |
| 2006/0183405 A1 | 8/2006 | Mathews |
| 2006/0217232 A1 | 9/2006 | Kondrat |
| 2006/0226298 A1 | 10/2006 | Pierson |
| 2006/0229843 A1 | 10/2006 | Freifeld |
| 2006/0273907 A1 | 12/2006 | Heiman |
| 2006/0273909 A1 | 12/2006 | Heiman |
| 2007/0097832 A1 | 5/2007 | Koivisto |
| 2007/0293324 A1 | 12/2007 | Tyler |
| 2009/0005167 A1 | 1/2009 | Arrasvuori |
| 2009/0053974 A1 | 2/2009 | Domm |
| 2009/0212103 A1 | 8/2009 | Li |
| 2009/0291764 A1 | 11/2009 | Kirkman |
| 2010/0062817 A1 | 3/2010 | Seydoux |
| 2011/0199194 A1 | 8/2011 | Waldock et al. |
| 2011/0250819 A1 | 10/2011 | Tashman |
| 2012/0009845 A1 | 1/2012 | Schmelzer |
| 2012/0179417 A1 | 7/2012 | Vincenzini |
| 2012/0238366 A1 | 9/2012 | Tedder |
| 2012/0295510 A1 | 11/2012 | Boeckle |
| 2013/0059284 A1 | 3/2013 | Giedgowd, Jr. |
| 2013/0143631 A1 | 6/2013 | Platzer |
| 2013/0143675 A1 | 6/2013 | Platzer |
| 2013/0288563 A1 | 10/2013 | Zheng |
| 2013/0217294 A1 | 11/2013 | Leyland |
| 2013/0296058 A1 | 11/2013 | Leyland |
| 2013/0324004 A1 | 12/2013 | Schwartz |
| 2014/0057524 A1 | 2/2014 | Teel |
| 2014/0273721 A1 | 9/2014 | Katan |
| 2015/0031268 A1 | 1/2015 | Waites |
| 2015/0042795 A1 | 2/2015 | Tsuria |
| 2015/0065258 A1 | 3/2015 | Meade |
| 2015/0094153 A1* | 4/2015 | Silverglate ............ A63H 17/38 463/43 |
| 2015/0224418 A1 | 8/2015 | Musliner |
| 2015/0286375 A1 | 10/2015 | Segal |
| 2015/0290548 A1 | 10/2015 | Meyers |
| 2015/0375114 A1 | 12/2015 | Scott |
| 2016/0144288 A1 | 5/2016 | Liu |
| 2016/0175723 A1 | 6/2016 | Boeckle |
| 2016/0184724 A1 | 6/2016 | Butler |
| 2016/0184725 A1 | 6/2016 | Wong |
| 2016/0287979 A1 | 10/2016 | Akavia et al. |
| 2016/0361662 A1 | 10/2016 | Akavia |
| 2016/0323969 A1 | 11/2016 | Aliakseyeu |
| 2017/0213475 A1 | 7/2017 | Butler |
| 2018/0104609 A1 | 4/2018 | Musliner |

\* cited by examiner

TOY VEHICLE ACCESSORY AND RELATED SYSTEM

CROSS REFERENCE TO RELATED APPLICATIONS

This application claims priority to and is based on U.S. Patent Application No. 62/577,346, filed Oct. 26, 2017, entitled "Toy Vehicle Accessory and Related System," the entire disclosure of which is incorporated herein by reference.

FIELD OF THE INVENTION

The present invention relates to a toy vehicle and a system with which the toy vehicle can be used. More specifically, the invention relates to a toy vehicle that includes a wireless tag that is used to identify the toy vehicle and a system that utilizes the identity of the toy vehicle and generates content related thereto. Additionally, the invention relates to a system that includes a reader that is used to identify the wireless tag of a toy vehicle and an online world or environment that relates to toy vehicles.

BACKGROUND OF THE INVENTION

Children can play in various ways with toy vehicles. However, there is a need for a new way to play with toy vehicles. There are several factors that children want to have in their play, namely, challenges, novelty and variety, customization and identity, and social play. In addition, children have a desire to have complexity introduced into their play. One type of complexity is in collecting items.

It is desirable to provide a toy vehicle that can be identified by an electronic system. It is desirable to provide an experience for users in which each user can collect and interact with toy vehicles as part of the user experience. It is also desirable to create an online environment in which collecting items is an integral part of the play.

SUMMARY OF THE INVENTION

An improved toy system is disclosed herein. In one aspect, the toy system includes a toy vehicle that can be uniquely identified. The toy vehicle includes a wireless tag that contains identifying information that is unique to the toy vehicle. In another aspect, the system includes a toy vehicle reader that can identify a toy vehicle that is proximate to the reader. The toy vehicle reader can wirelessly communicate with the tag, and in particular with a chip on the tag, on the proximate toy vehicle. In one embodiment, the toy vehicle reader utilizes Near Field Communication (NFC) technology to read the tags on vehicles.

The invention also relates to a global connected toy platform that includes a multiplayer online game. By utilizing the toy vehicle with the toy platform, the invention provides a 360-degree play system and experience. The platform creates play that combines digital play and toys.

BRIEF DESCRIPTION OF THE DRAWINGS

Like reference numerals have been used to identify like elements throughout this disclosure.

DETAILED DESCRIPTION OF THE INVENTION

The present invention disclosed herein is a toy accessory system and a platform for use with the system. The accessory system and the platform provide a user-centric system of play that involves digital, physical, and social aspects. In one embodiment, the toy accessory system includes a toy vehicle and a toy vehicle accessory. The toy vehicle includes a wireless tag with identifying information and the toy vehicle accessory is a reader that can identify the tag on the toy vehicle.

Figure 1:
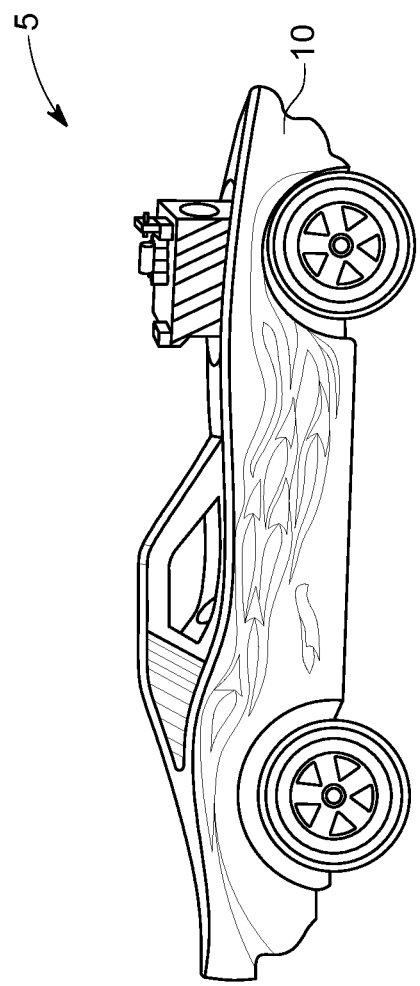
FIG. 1 illustrates an illustrative view of an embodiment of a toy vehicle according to the present invention.
Figure 1:
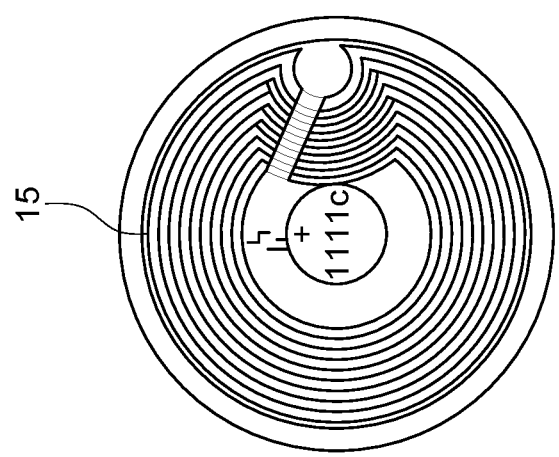

Referring to FIG. 1, an embodiment of a toy according to the present invention is illustrated. In this embodiment, the toy 5 includes a toy vehicle 10 and a wireless tag 15 coupled to the toy vehicle 10. In one embodiment, the wireless tag 15 is located inside of the toy vehicle 10. In another embodiment, the tag 15 may be placed on the outside of toy vehicle 10, such as on the lower surface of the vehicle's chassis or on the body of the vehicle.

Figure 2:
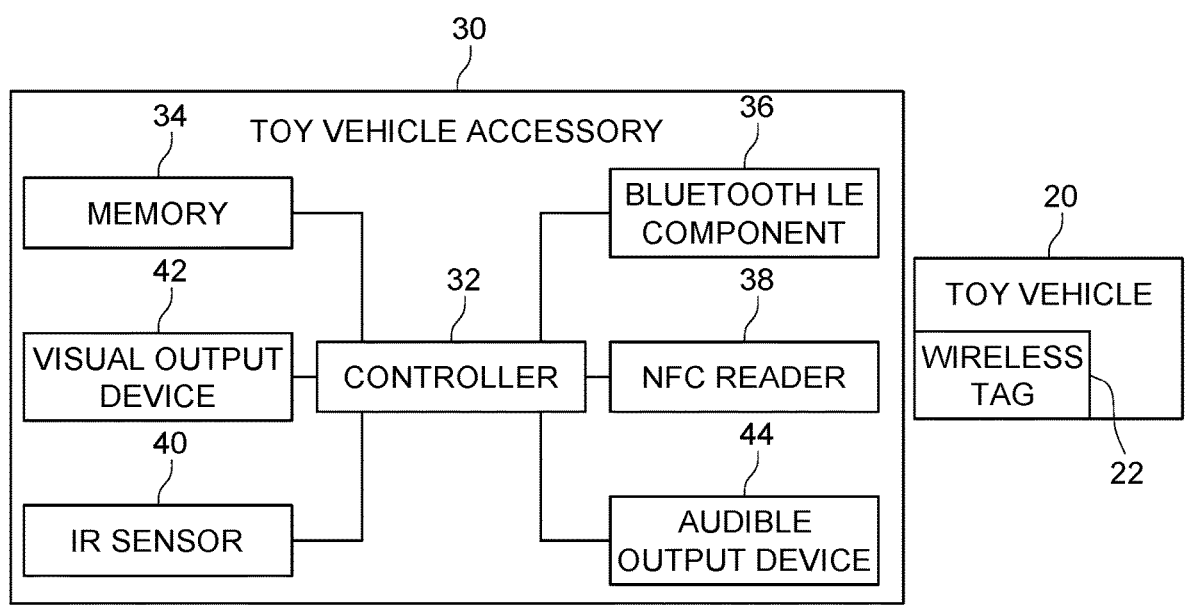
FIG. 2 illustrates a schematic block diagram of the electronic components of toy vehicle and a toy vehicle accessory according to the present invention.

Referring to FIG. 2, a schematic block diagram of the present invention is illustrated. As shown, toy vehicle 20 includes a wireless tag 22 with identifying information about the toy vehicle 20. The wireless tag 22 includes a flexible substrate to which a chip and an antenna coil are coupled. In one embodiment, all or part of the antenna coil may be wound into a particular pattern, such as the Hot Wheels logo.

Also illustrated is a toy vehicle accessory 30. In this embodiment, the toy vehicle accessory 30 includes a controller 32 that is connected to a memory 34 as well as a BLUETOOTH Low-Energy component 36. The accessory 30 also includes a Near Field Communications (NFC) reader 38. The NFC reader 38 is used to identify the wireless tag 22 on a toy vehicle that is proximate to the reader 38.

In one embodiment, the toy vehicle accessory 30 also includes an infrared (IR) sensor system 40 that is used to determine the speed of a toy vehicle 20 passing by the accessory 30. In addition, the accessory 30 includes a visual output device 42 (such as a LED) and an audible output device 44 such as a transducer. The various visual and audible outputs generated by devices 42 and 44 vary based on the information detected by the reader 38 and/or the IR sensor system 40.

Figure 3:
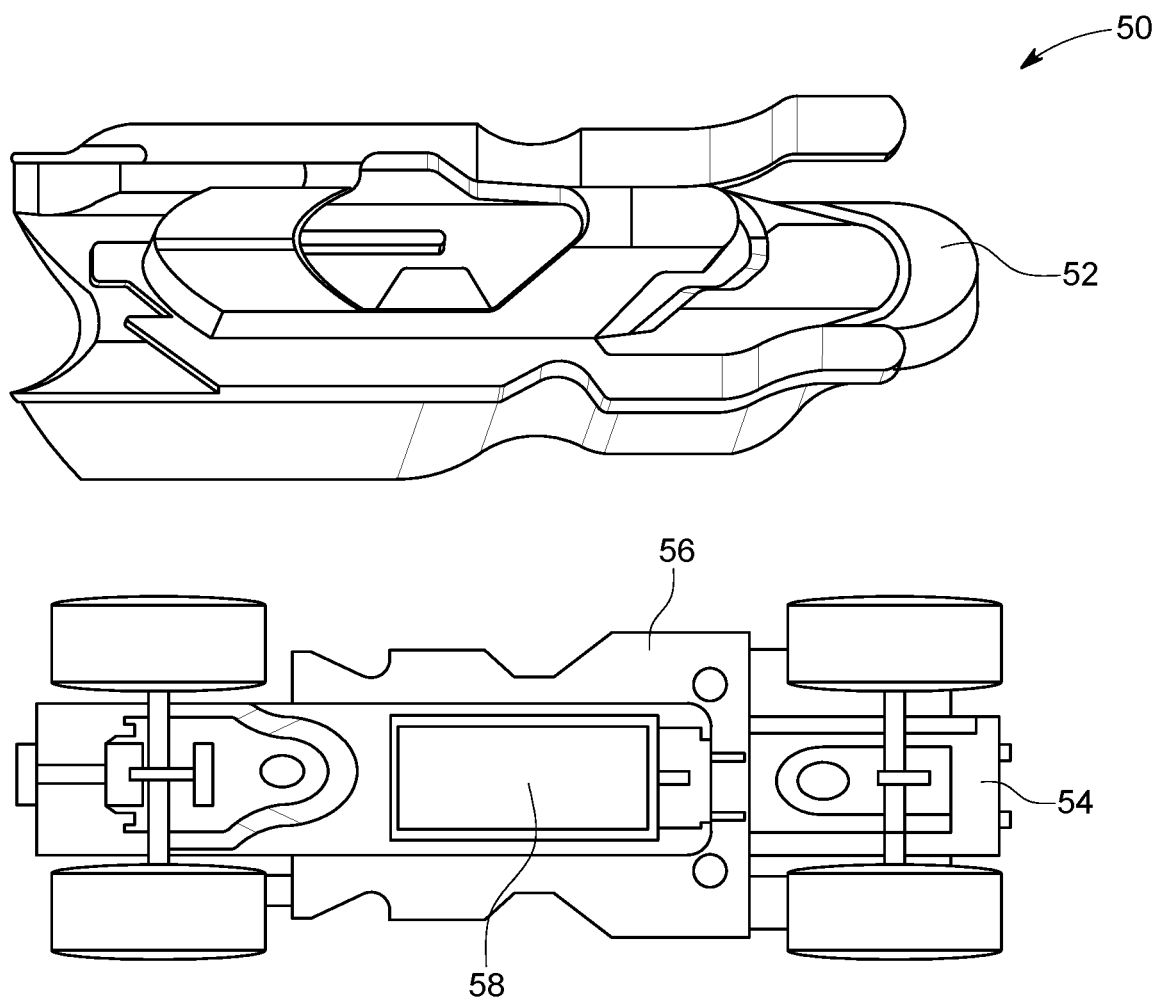
FIG. 3 illustrates an exploded perspective view of an embodiment of a toy vehicle according to the present invention.

Referring to FIG. 3, an embodiment of a toy vehicle according to the present invention is illustrated. In this embodiment, toy vehicle 50 includes an upper body 52 and a chassis 54 to which the upper body 52 is coupled. In FIG. 3, the upper body 52 and the chassis 54 are shown separated for ease of reference. The chassis 54 has an inner or upper surface 56 that includes a recess 58 formed therein. The recess 58 is sized and configured to receive a wireless tag (not shown). The wireless tag can be read by an external reader.

Figure 4:
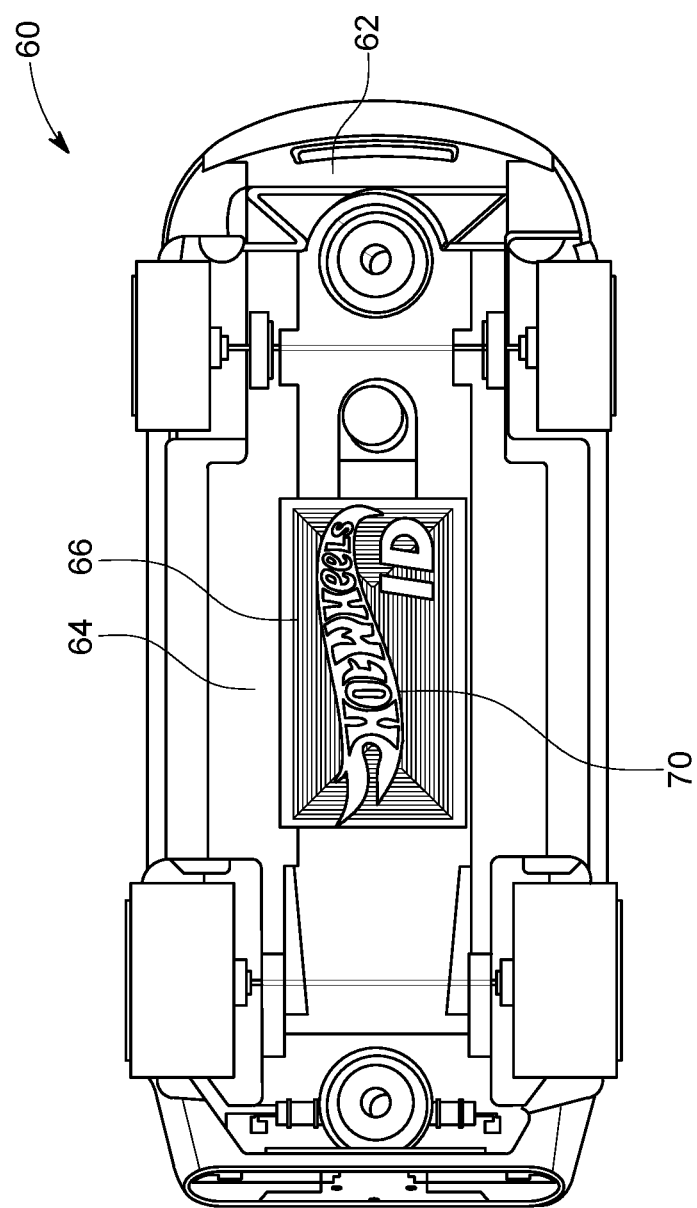
FIG. 4 illustrates a bottom view of an embodiment of a toy vehicle according to the present invention.

Referring to FIG. 4, another embodiment of a toy vehicle according to the present invention is illustrated. The toy vehicle 60 includes a chassis 62 that has an outer or lower surface 64. Formed in the outer surface 64 is a recess or cavity 66 in which a wireless tag 70 is placed. Similar to the internally mounted tag referenced above with respect to FIG. 3, wireless tag 70 can be read by an external reader.

Figure 5:
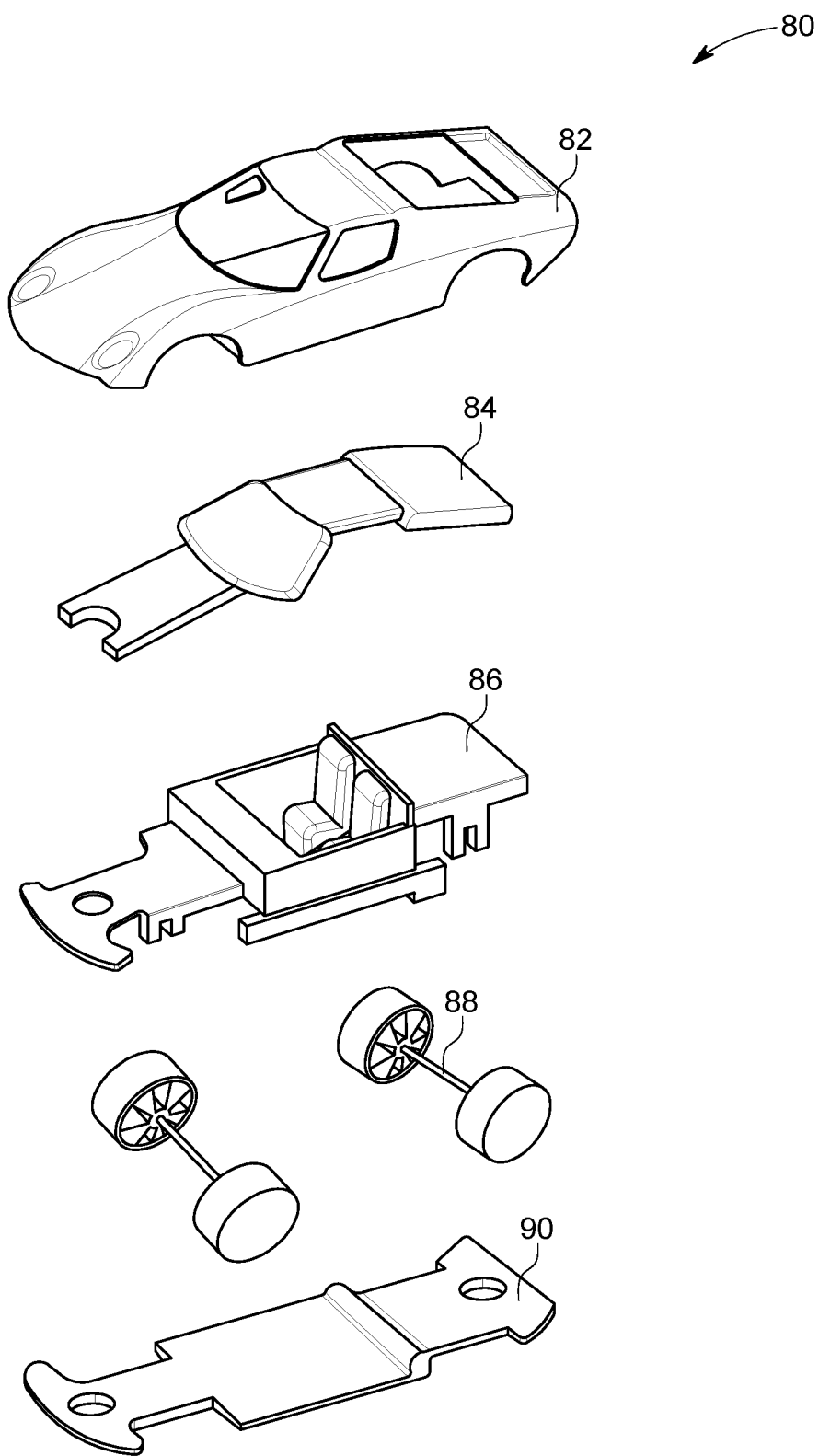
FIG. 5 illustrates an exploded perspective view of an embodiment of a toy vehicle according to the present invention.
Figure 6:
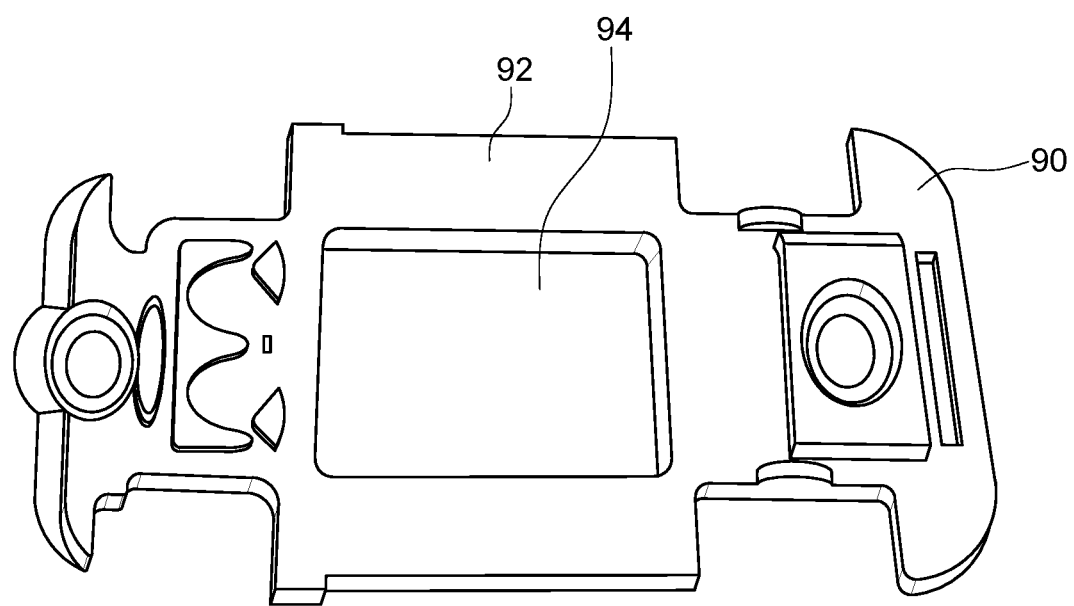
FIG. 6 illustrates a bottom view of the chassis of the toy vehicle illustrated in FIG. 5.

Another embodiment of a toy vehicle is illustrated in FIGS. 5-6. Toy vehicle 80 includes an upper body portion 82, a transparent or translucent plastic layer 84, an inner body portion 86, two pairs of wheels 88, and a chassis 90 to which the upper body portion 82 is coupled. The chassis 90 has an outer or lower surface 92 that has a recess 94 formed therein (see FIG. 6). The recess 94 is substantially rectangular and matches the shape and size of a wireless tag that is mounted therein.

Figure 7:
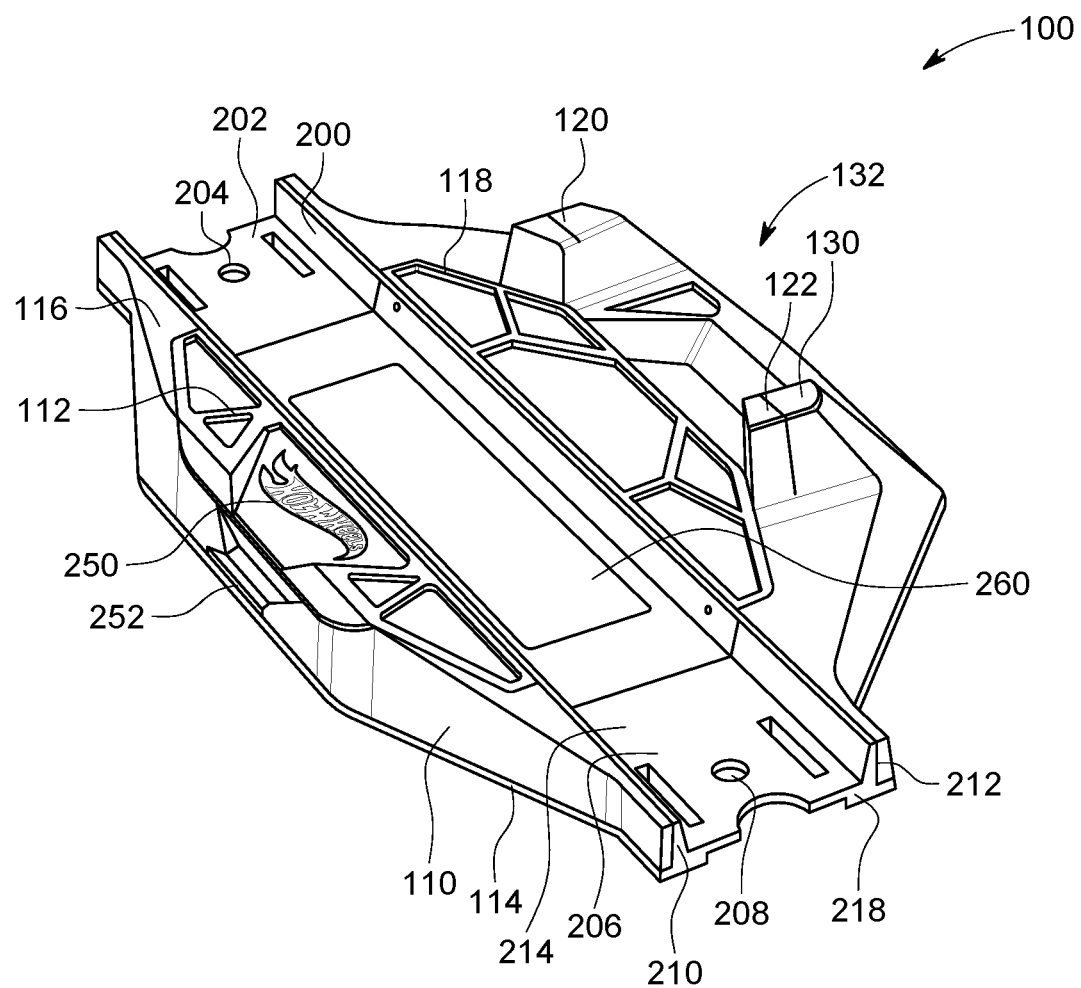
FIG. 7 illustrates a perspective view of an embodiment of a toy vehicle accessory according to the present invention in a first configuration.
Figure 8:
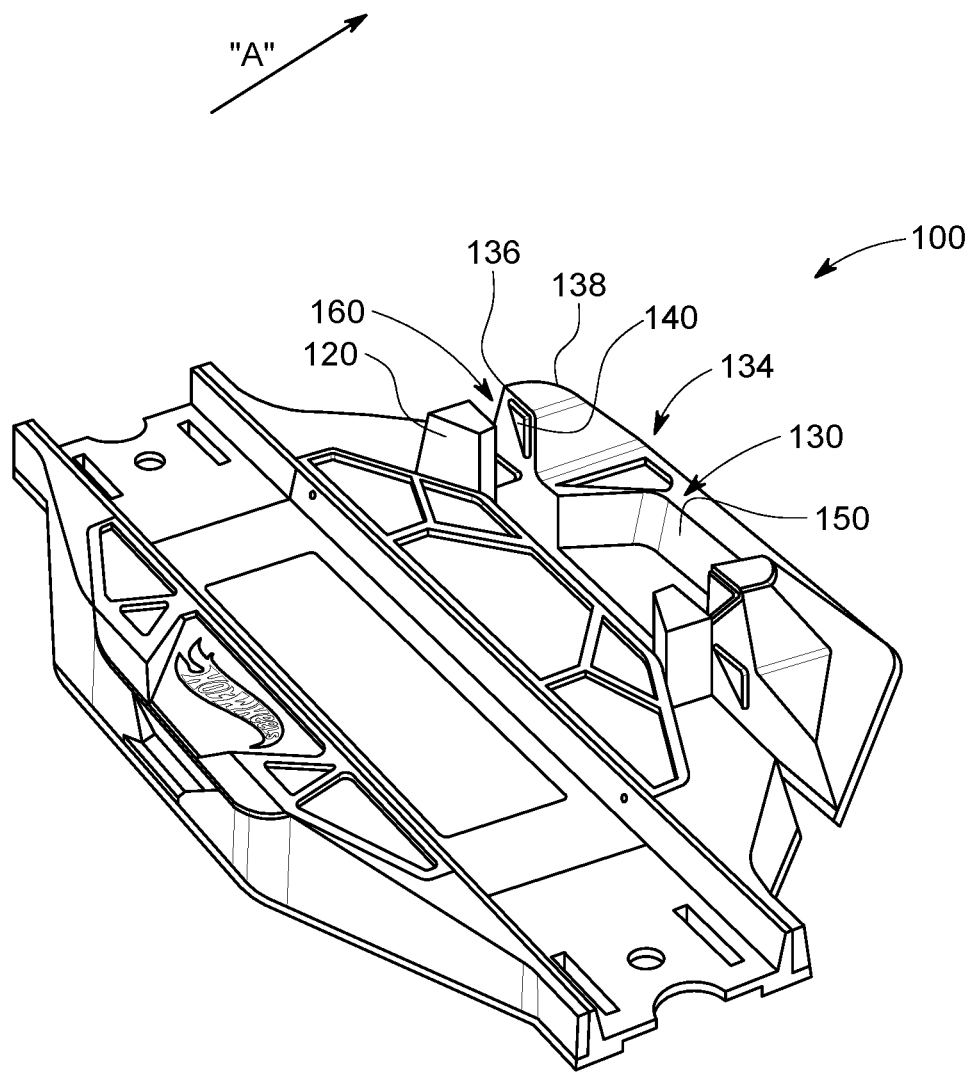
FIG. 8 illustrates a perspective view of the toy vehicle accessory illustrated in FIG. 7 in a second configuration.

Referring to FIGS. 7 and 8, an embodiment of a toy vehicle accessory according to the present invention is illustrated. The toy vehicle accessory can be referred to alternatively as a portal. The toy vehicle accessory 100 includes a base 110 and a track portion 200. The base 110 has an upper side 112 and an opposite lower side 114 that can be placed onto a support surface. In addition, the base 110 includes opposite side portions 116 and 118 and supports 120 and 122.

Proximate to supports 120 and 122 is a holding portion 130 that forms a clamp to hold an electronic mobile device, such as an IPAD or an IPHONE. The holding portion 130 can be moved along the direction of arrow "A" in FIG. 8 relative to the base 110 between a closed position 132 (see FIG. 7) and an opened position 134 (see FIG. 8).

When holding portion 130 is in its opened position 134, the holding portion 130 defines a channel or groove 160 in which a mobile device may be inserted, as described in more detail below. The holding portion 130 includes a wall surface 136 as well as supports 138. Each of the supports 138 includes a contact pad 140. Contact pads 140 enable a mobile device to be supported and held by the toy vehicle accessory 100 without damaging the mobile device. As shown in FIG. 7, the holding portion 130 includes a recessed area 150 into which a user can insert his or her fingers to pull the holding portion 130 outwardly away from the rest of the accessory 110 to form the groove 160.

Referring back to FIG. 7, the track 200 has a first end 202 and an opposite second and 206. Each of the track ends 202 and 206 includes connection points 204 and 208, respectively. Each connection point is 204 and 208 engageable by a track connector (not shown) that enables a separate track section to be coupled to track 200.

Track 200 also includes opposite sidewalls 210 and 212 that extend along the length of the track portion of toy vehicle accessory 100. Between the sidewalls 210 and 212 is a track surface 214 along which a toy vehicle can travel and/or be placed. The track surface 214 is integrally formed with lower tabs 216 and 218 which form part of the lower surface 114 of the accessory 100. Each of the sidewalls 210 and 212 includes a pair of openings that are sized to enable light emitted from infrared (IR) sensors to be received by corresponding receives on the opposite side of the track. The IR sensors are connected to the controller and are used to determine the speed of a toy vehicle passing along track 200 of accessory 100 as the IR beams are broken. The movable portion includes an LED output 250, a USB port 252, and an NFC reader 260 located internally beneath the track.

Figure 9:
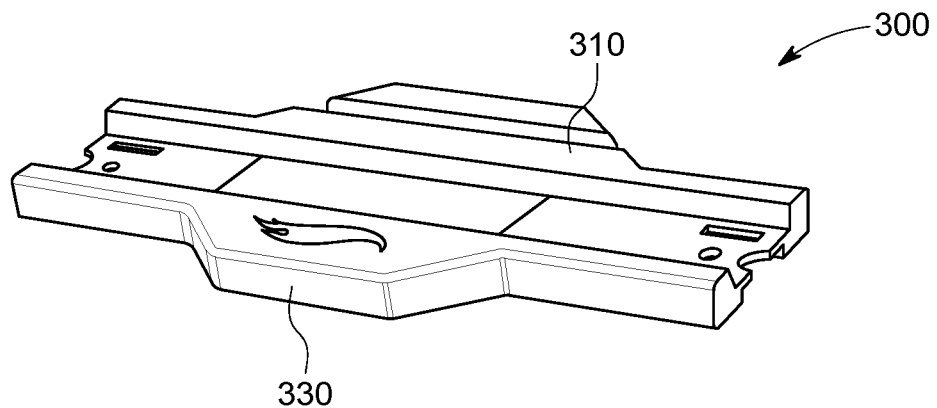
FIG. 9 illustrates a perspective view of another embodiment of a toy vehicle accessory according to the present invention.

Referring to FIG. 9, a perspective view of a toy vehicle accessory according to the present invention is illustrated. In this embodiment, the toy vehicle accessory 300 includes a base portion 310 and a movable portion 330 that can be selectively engaged with the base portion 310. In other words, the movable portion 330 can be separated from the base portion 310 and easily carried or transported. The movable portion 330 includes a reader that is used to identify a wireless tag on a toy vehicle.

Figure 10:
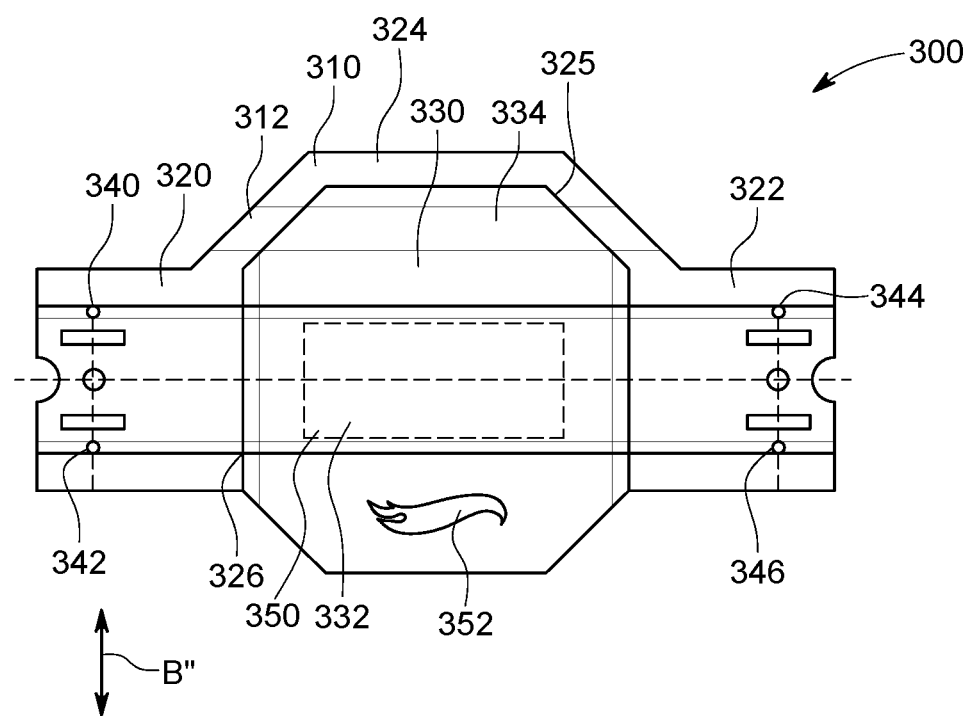
FIG. 10 illustrates a top view of the toy vehicle accessory illustrated in FIG. 9.

Referring to FIG. 10, toy vehicle accessory 300 is shown with the base section 310 and the movable section 330 coupled to each other. The base section 310 includes a first side portion 320, a second side portion 322, and a connecting portion 324 that is located generally between the side portions 320 and 322 and that couples the side portions 320 and 322 together. In one embodiment, the connecting portion 324 is integrally formed with the side portions 320 and 322. An inner wall 325 on the side portions 320 and 322 and the connecting portion 324 collectively define a cavity 326 into which the movable portion 330 can be placed or inserted (see FIG. 10).

The movable portion 330 includes a track portion 332 on which toy vehicle 305 can be placed that aligns with the track sections on side portions 320 and 322. The movable portion 330 also includes a groove 334 that aligns with grooves 312 formed in the connecting portion 324 when the movable portion 330 is engaged in the cavity 326. The grooves 312 and 334 collectively form a channel in which a mobile device may be inserted.

The movable portion 330 includes an NFC reader 350, which is shown in dashed lines beneath the track section 332 of movable portion 330. A light source 352 is connected to the electronic components of the movable portion 330.

Referring to FIG. 10, the track sections of side portions 320 and 322 include openings formed therein. Openings 340 and 342 are aligned so that an IR beam passes from one opening to the other. The IR emitter and receiver are used to determine when a toy vehicle breaks the IR beam that extends between openings 340 and 342. Similarly, openings 344 and 346 are aligned so that another IR beam passes from one to the other. When a toy vehicle traveling along accessory breaks both of the IR beams, the speed of the toy vehicle can be measured based on the known distance between the beams and the amount of time between the breaks in the two beams.

Figure 11:
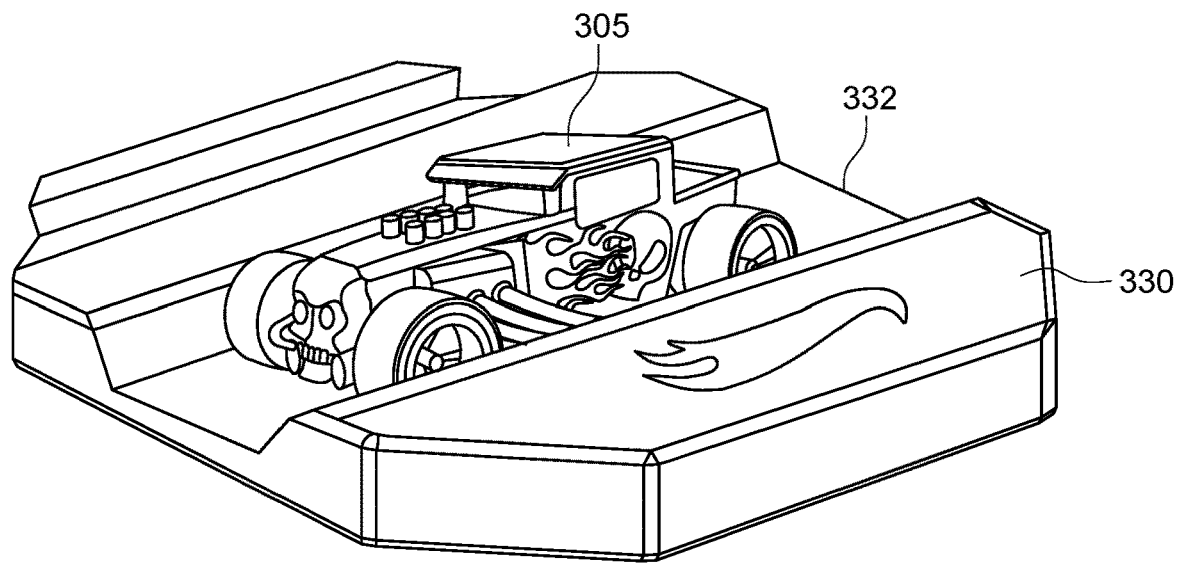
FIG. 11 illustrates a perspective view of a removable reader portion of the toy vehicle accessory illustrated in FIGS. 9 and 10.

Referring to FIG. 11, the movable portion 330 is shown with a toy vehicle 305 placed on the track section 332. When the toy vehicle 305 is in this location, the reader of the movable portion 330 can wirelessly activate the antenna of the tag on the toy vehicle 305 and cause the antenna to generate a signal with the identifying information in the chip of the tag. As a result, the reader can identify the particular toy vehicle 305 on the movable portion 330.

Figure 12:
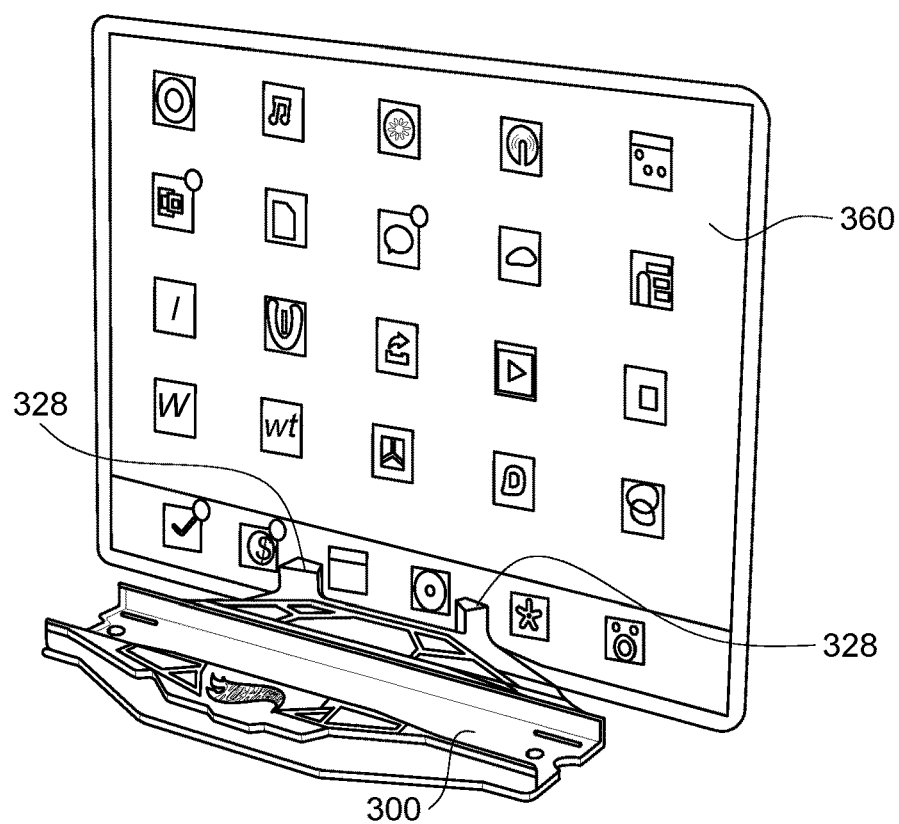
FIG. 12 illustrates a perspective view of the toy vehicle accessory illustrated in FIGS. 7 and 8 in use with a mobile device.

Referring to FIG. 12, a perspective view of the toy accessory 300 with a mobile device 360 mounted thereon is shown. The toy accessory 300 includes supports 328 that engage the front surface of the mobile device 360. The toy accessory 300 includes similar supports behind a mobile device 360. By placing the mobile device 360 in this location relative to the movable portion 330, the Bluetooth LE component of the movable portion 330 can communicate with the mobile device 360. Thus, content can be displayed on the mobile device 360 based on the toy vehicle information detected by the reader of the movable portion 330.

Figure 13:
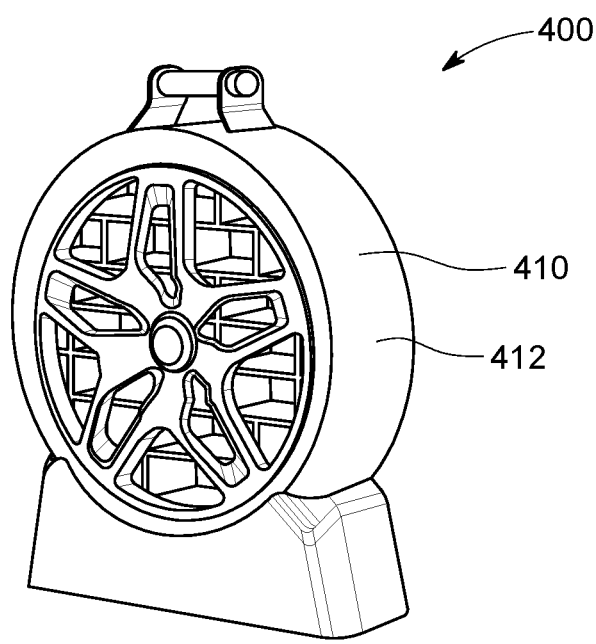
FIG. 13 illustrates a perspective view of an embodiment of a toy vehicle case according to the present invention in a first configuration.
Figure 14:
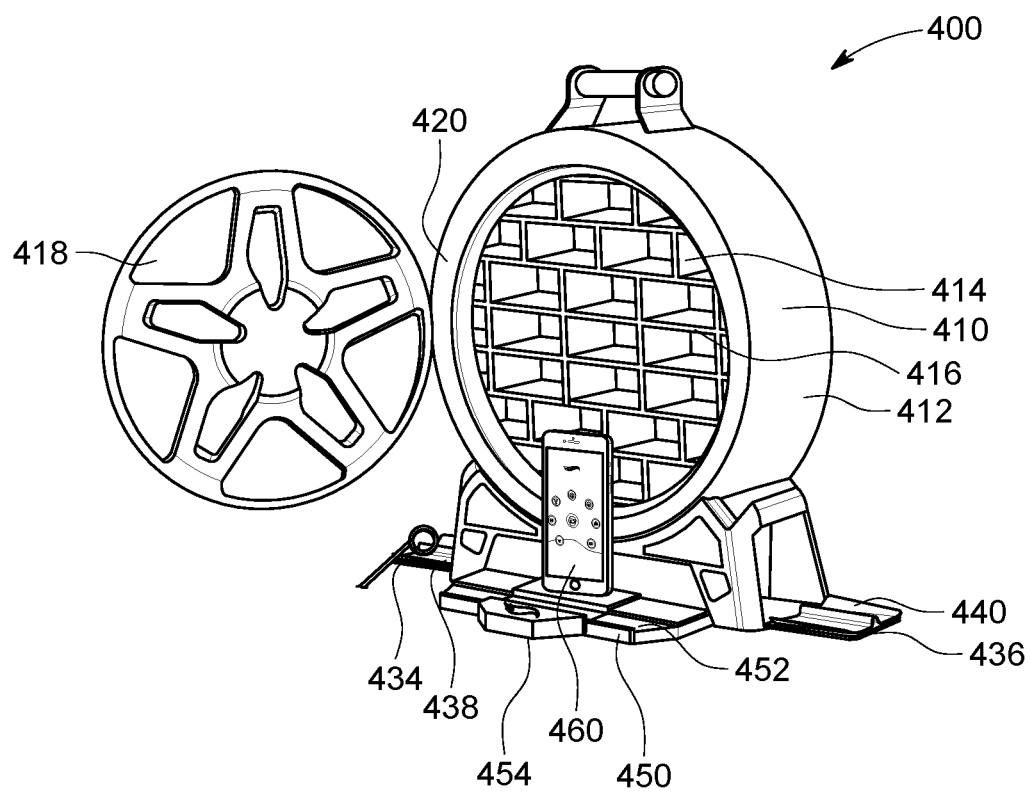
FIG. 14 illustrates a perspective view of the toy vehicle case illustrated in FIG. 13 in a second configuration.

Referring to FIGS. 13 and 14, an embodiment of the case according to the present invention is illustrated. As shown, case 400 includes a housing 410 that has a substantially circular wall 412 that defines a cavity 414. There are several plates defining shelves 416 in the cavity 414 that define small receptacles into which toy vehicles can be placed. As shown in FIG. 14, a front door 418 is coupled to the housing 410 via a hinge 420.

The case 400 includes side lower doors 434 and 436 that include track portions 438 and 440, respectively, on each of their inner surfaces. The track portions 438 and 440 are configured to be connected to separate track sections via connectors or couplers. On the front of the base 430 is a panel 450 that can be pivoted down to a substantially horizontal position such as that as shown in FIG. 14. The panel 450 includes a toy vehicle accessory similar to toy vehicle accessory 300 described above. A movable portion 454 with a reader and track section 452 corresponds with the previously described movable portion 330. A mobile device 460 is shown as mounted in the channel or groove that is defined by the toy vehicle accessory.

Figure 15:
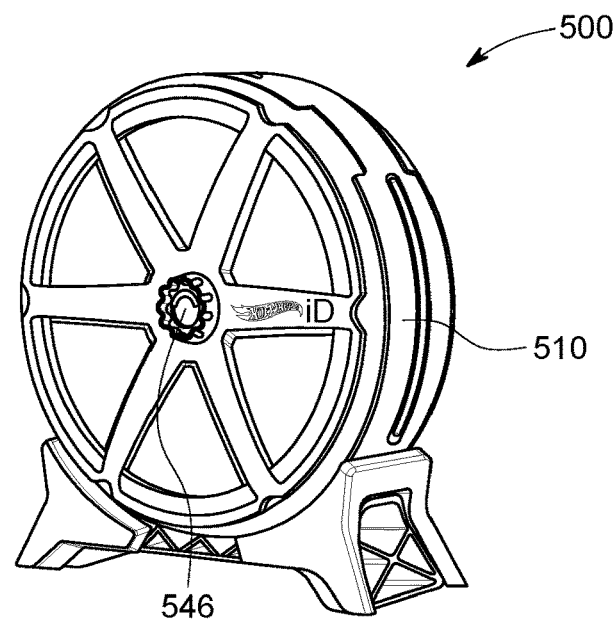
FIG. 15 illustrates a perspective view of another embodiment of a toy vehicle case in a first configuration.
Figure 16:
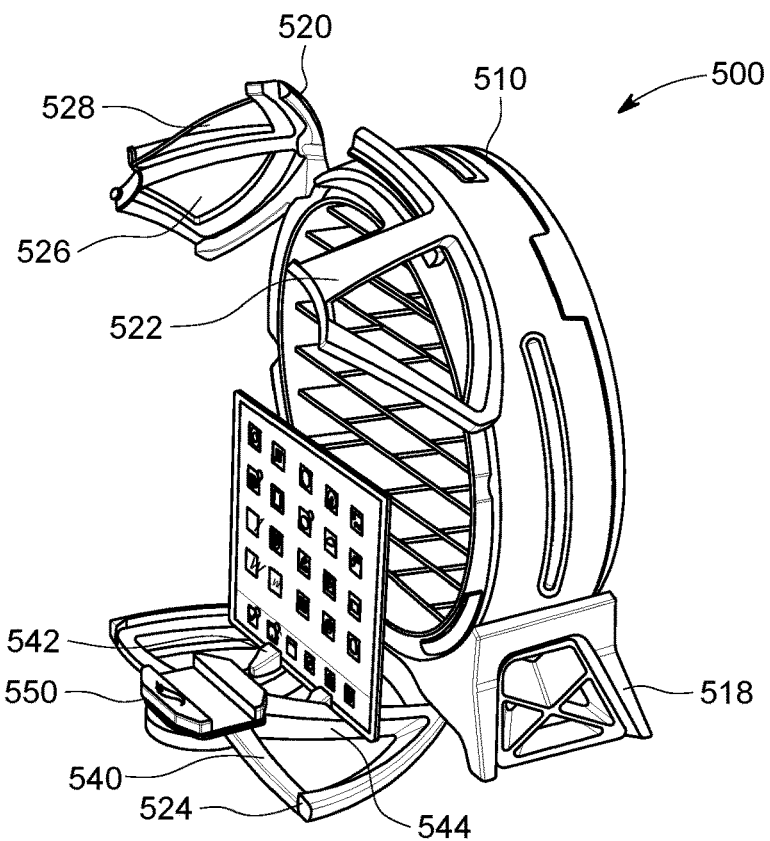
FIG. 16 illustrates a perspective view of the toy vehicle case illustrated in FIG. 15 in a second configuration.
Figure 17:
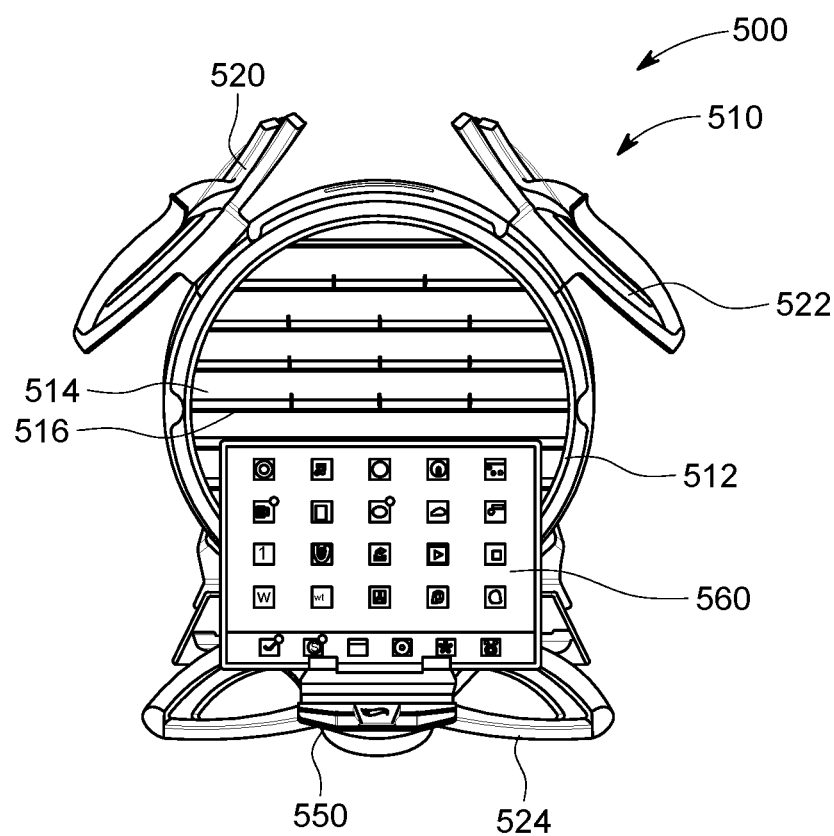
FIG. 17 illustrates a front view of the toy vehicle case illustrated in FIG. 16.

Referring to FIGS. 15-17, an alternative embodiment of a case according to the present invention is illustrated. Case 500 includes a housing 510 with a wall 512 that defines a cavity 514. Inside of cavity 514 are several shelves 516 that define receptacles into which toy vehicles can be placed. The case 500 includes a base 518 that can engage a support surface.

In this embodiment, the case 500 includes several door portions 520, 522, and 524 that are movable between closed positions 530 (see FIG. 15) and opened positions 532 (see FIGS. 16 and 17). As shown in FIG. 16, each door portion also includes an opening 526 that is covered by a translucent or transparent piece of plastic 528. Collectively, the door portions 520, 522, and 524 form a front door for the case 500 and are held in their closed positions by a rotary lock 546 (see FIG. 15). Referring to FIG. 16, the door portion 524 includes an inner surface 540 that is accessible when the door portion 524 is in its opened or lowered position. Coupled to the inner surface 540 are supports 542 and 544 that are used to support a mobile device 560. In addition, a movable portion 550 containing a tag reader is coupled to the inner surface 540.

Figure 18:
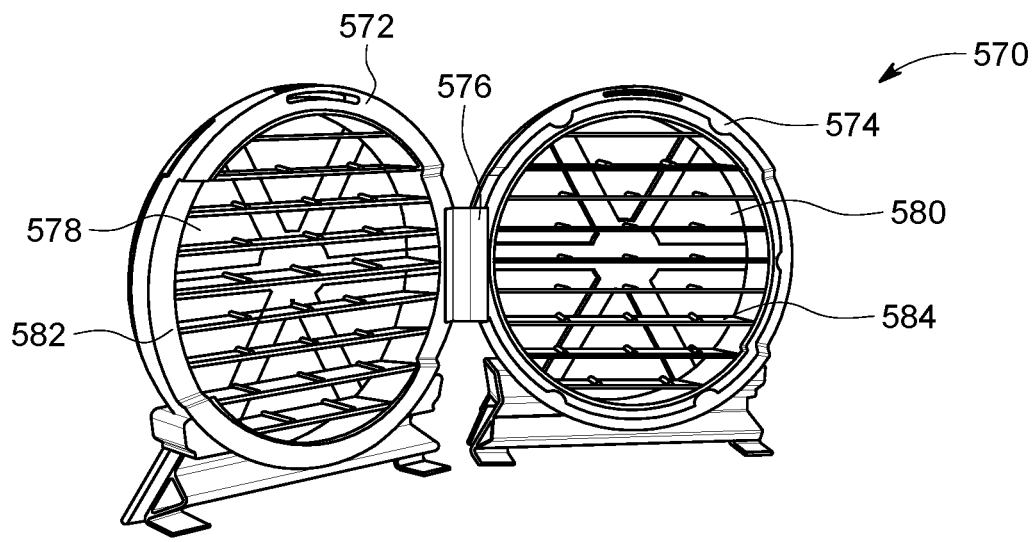
FIG. 18 illustrates a front view of an alternative embodiment of a toy vehicle case according to the present invention.

Referring to FIG. 18, an alternative embodiment of a case according to the present invention is illustrated. Case 570 includes a pair of housing portions 572 and 574 that are coupled together by a hinge 576. The housing portions 572 and 574 are shown in their open positions in FIG. 18. Each housing portion 572 and 574 includes cavities 578 and 580, respectively, that have several shelves 582 and 584 provided therein for toy vehicles.

Figure 19:
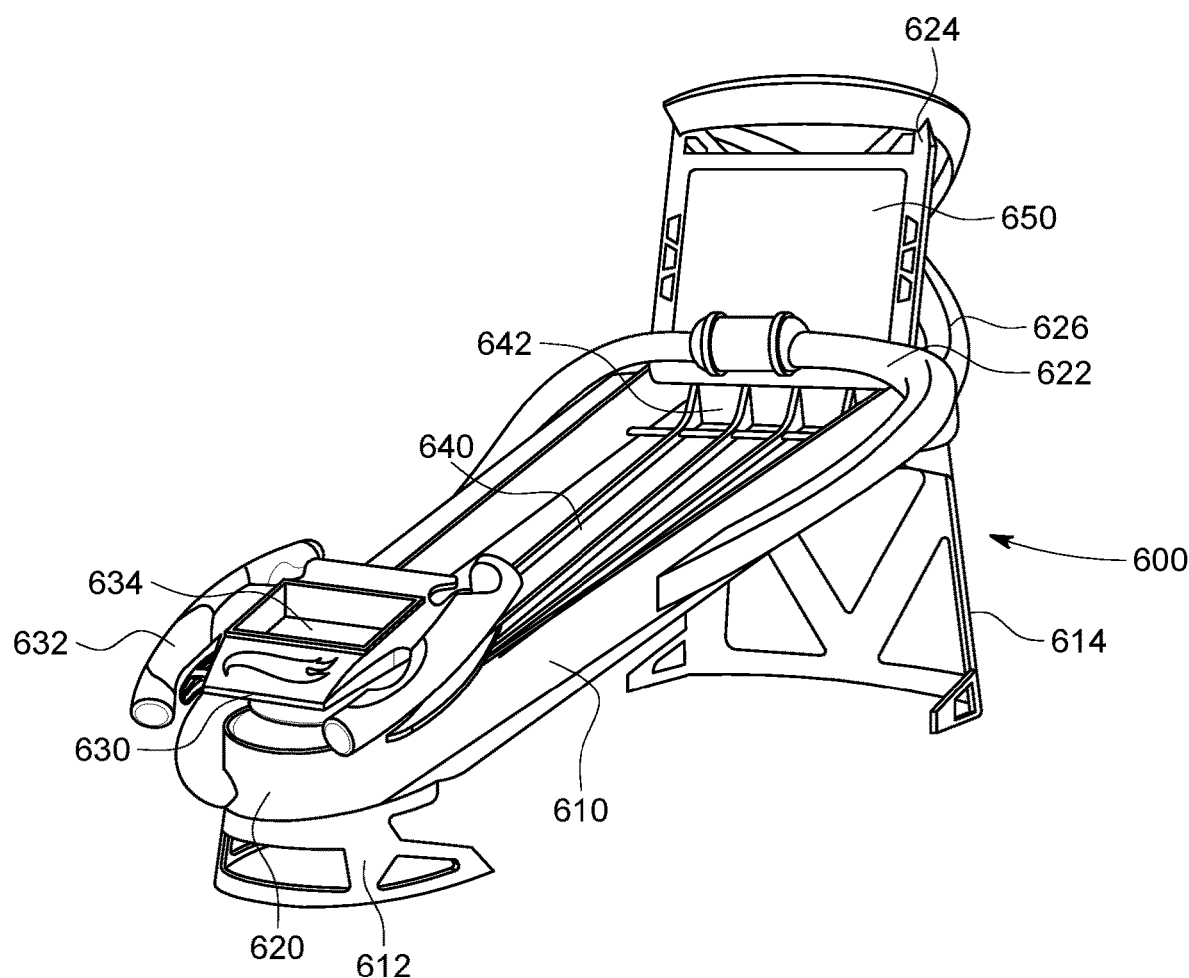
FIG. 19 illustrates a perspective view of an embodiment of a toy according to the present invention.

Referring to FIG. 19, an embodiment of another toy according to the present invention is illustrated. Toy 600 provides players with reaction, timing, and aiming skills in a toy vehicle launching game. Toy 600 includes a housing 610 that is supported by legs 612 and 614. The housing 610 includes a proximal or lower end 620 and a distal or upper end 622. At the distal end 622, the housing 610 includes a support 624 that is configured to hold a mobile device 650. The proximal end 620 includes memory (not shown) to save results from offline play (when a player uses the toy 600 without connecting it to any mobile devices).

Coupled to the housing 610 proximate to lower end 620 is a toy vehicle launcher or booster 630. Launcher 630 includes handles 632 and is designed so that a user can launch toy vehicles along a play surface 640 toward various targets 642. An example of such a toy vehicle launcher is identified in U.S. patent application Ser. No. 13/967,756 filed Aug. 15, 2013, the contents of which are incorporated herein in their entirety. Launcher 630 includes a receptacle 634 in which a mobile device (not shown) can be placed. In one embodiment, some of the targets 642 are openings through which the launched toy vehicles can travel to access the looped track 626.

The play pattern for toy 600 involves launching toy vehicles toward targets 642 to obtain a high score. Bonus points are given in the game for hitting the right target a certain amount of times or launching a toy vehicle that travels up track 626 successfully. The toy 600 can be used with mobile devices to unlock endless game experiences. In one implementation, the mobile device used with toy 600 can be used to unlock multiplayer game modes to play real-time against another player and to accept and send challenges.

Figure 20:
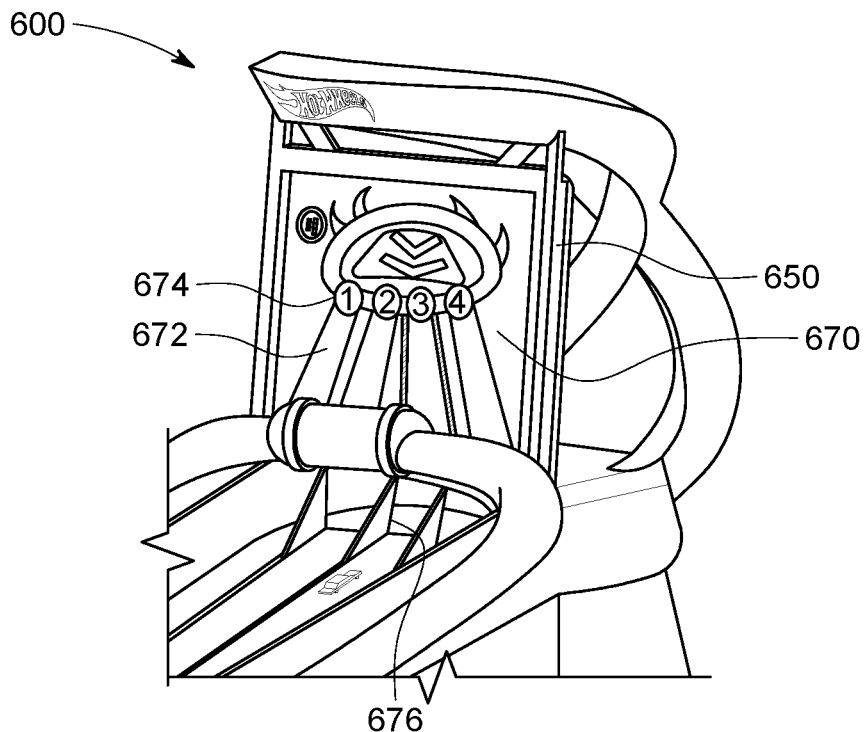
FIGS. 20-21 illustrate different partial perspective views of the toy illustrated in FIG. 19 showing the mobile device displaying game play shots according to the present invention.

Referring to FIG. 20, an exemplary game play using toy 600 is illustrated. In this game play, mobile device 650 displays a game 670 that shows four virtual track sections 672 that correspond to the four lanes on the playing surface of toy 600. Each virtual track section includes a lane number 674 on the display. The track section for lane number 3 is illuminated on the display and the actual lane on the toy 600 is also illuminated by a light source 676. Each lane has its own light source that is illuminated simultaneously with the corresponding virtual track section on the display. The game play involves the particular lane and its displayed virtual track section being illuminated simultaneously as a target at which the player should launch a toy vehicle from launcher 630 while the lane and track section are illuminated. Points are given to the player if the toy vehicle is detected entering the correct lane within the appropriate timeframe.

Figure 21:
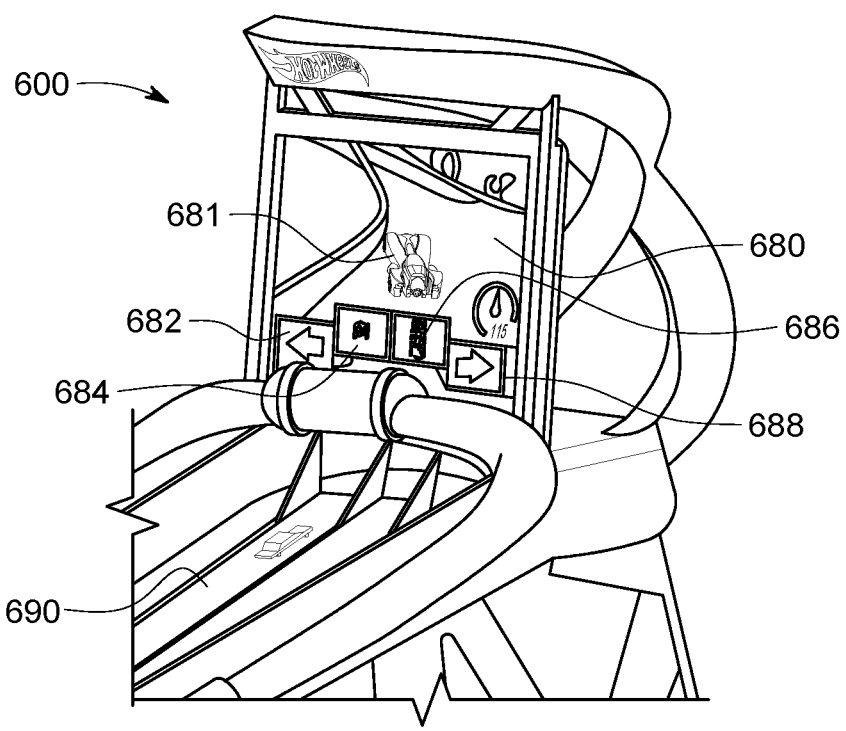

Another game play using toy 600 according to the invention is illustrated in FIG. 21. As shown, the display 680 on the mobile device shows a driving game in which the player controls the displayed toy vehicle 681 by directing toy vehicles 690 into a desired one of the lanes on the playing surface. Each of the lanes on the playing surface is associated with one of the driving feature icons at the bottom of the display. For example, the leftmost lane corresponds to icon 682 and passage of a vehicle in that lane is detected and causes the displayed toy vehicle 681 to turn to the left. Similarly, the rightmost lane corresponds with icon 688 and passage of a toy vehicle therethrough causes the virtual vehicle 681 to turn to the right. Similarly, the middle two lanes are associated with braking 684 and accelerating 686 of the virtual vehicle 681. Thus, the player can control the displayed vehicle 681 by using toy vehicles 690 propelled by the launcher 630.

The invention relates to a toy accessory system and a platform for use with the system. The accessory system and the platform provide a user-centric system of play that involves digital, physical, and social aspects, as described in more detail below. The platform includes an online world that has a "virtual garage" in which you can store and work on your virtual toy vehicles that you have collected. Some digital aspects include unlocking a vehicle in your virtual garage, adding a vehicle to a game, and receiving special downloadable content in existing mobile games. Some physical aspects include performance measurement, visual and audible outputs, and personalization. Some social aspects include worldwide leaderboards, social sharing, and community events. The overall play includes buying/collecting toy vehicles, completing/playing with the toy vehicles, and experiencing the online world and sharing the virtual components with others. In a player's garage, notifications and timers serve as reminders to play, find new mixes in stores, and get activity updates.

Figure 22:
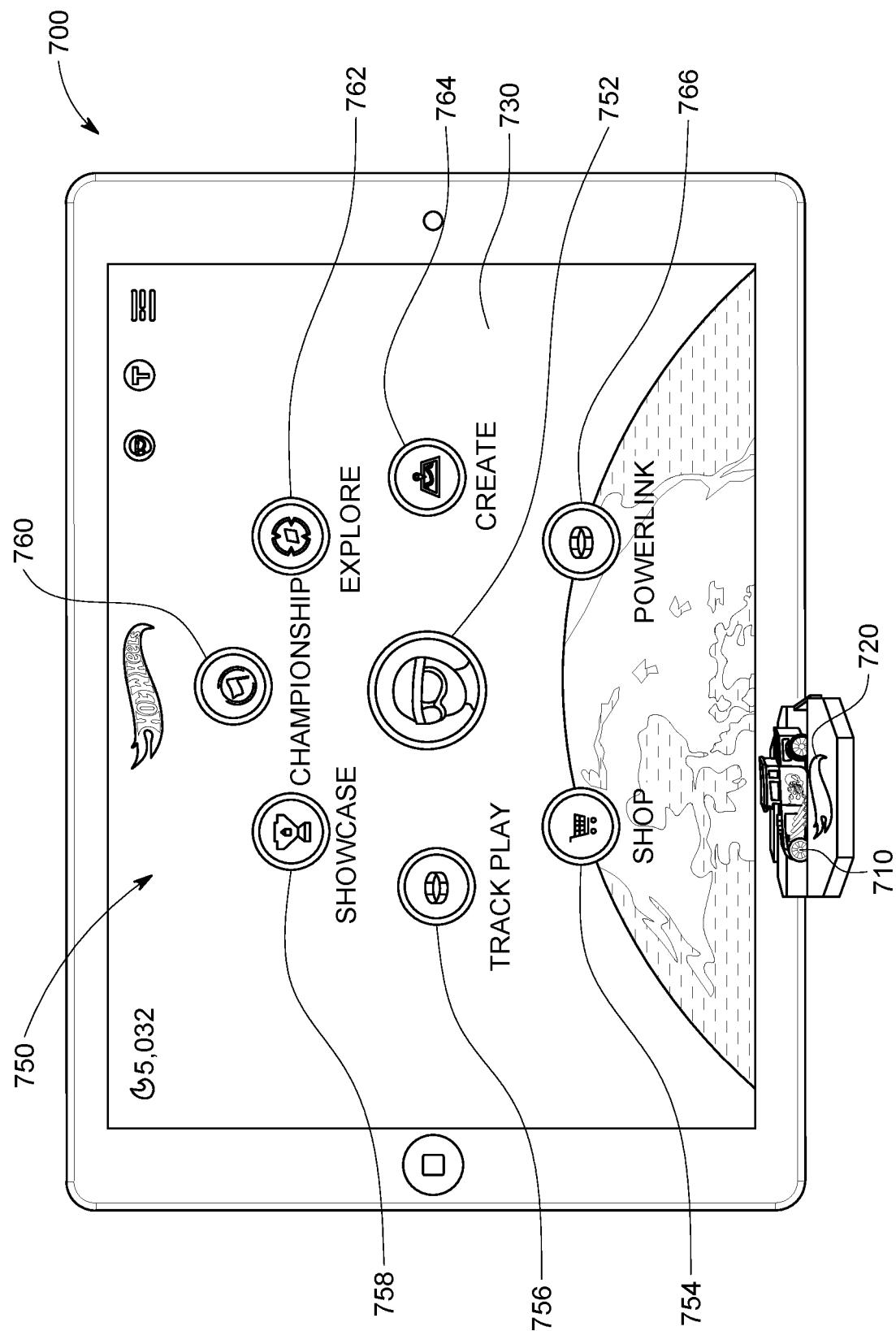
FIGS. 22-33 illustrate several user interfaces from the virtual online environment that can be used with a toy vehicle according to the present invention.

The invention relates to a platform that provides a connected, 360-degree play experience across both physical and digital worlds. Referring to FIG. 22, a toy assembly 700 that includes a toy vehicle 710, a reader 720, and a mobile device 730 is illustrated. The screen of the mobile device 730 shows a user interface 750 that is an exemplary user interface from the online world platform.

The user interface 750 includes several icons that are links to different content. Icon 752 shows the particular avatar that a user has selected to identify the user's "garage" on the platform. When the user logs into the online world platform, the user will see icon 752. The icons surrounding icon 752 provide a variety of play scenarios (both physical and digital).

Shop icon 754 enables the user to access a virtual store to purchase features for the user's toy vehicle. Track Play icon 756 is a link to a part of the online world in which a user can play online games. Showcase icon 758 and Championship icon 760 can be used to access different parts of the online world as well. Similarly, Explore icon 762, Create icon 764, and Powerlink icon 766 can be used to access different parts of the online world.

In one embodiment, the Championship icon 760 leads to a championship series that includes a set of mini-racing games and challenges for users to test their virtual vehicles against each other. By entering a championship, a player or user is able to join circuits of challenges against others by using in-game currency to enter. The higher the cost to enter, the greater the challenge and rewards. In some embodiments, championships are timed, anywhere from 23 hours to one week.

Once a user has entered into a championship, the user has to compete with others on a circuit of different competitions. For example, players must race through many different game types and achieve amongst the top ranks to earn the best parts and most currency to progress. Players are able to join one league at a time using their earned currency. However, players won't be able to enter higher levels of play until they have won enough challenges. After each challenge, a player can see his or her personal performance and standing against others and what car was used. In one embodiment, the Track Play icon 756 can be used by a player to experience the physical track play.

Figure 23:
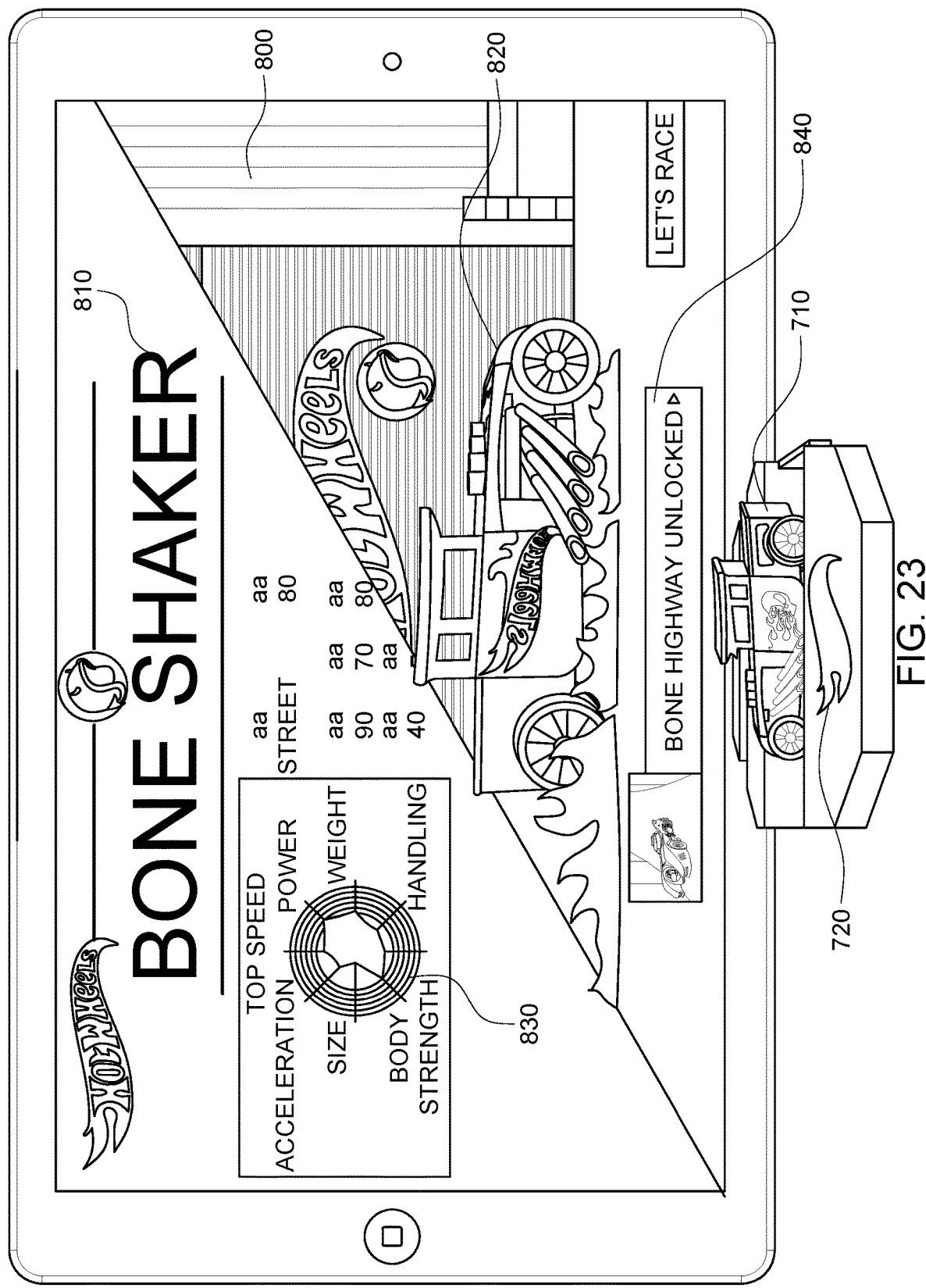

Referring to FIG. 23, a toy vehicle 710 is placed on a reader 720 that identifies the particular toy vehicle 710. The reader 720 is connected to a mobile device via a Bluetooth LE signal. The mobile device shows a user interface 800 that is tied to the particular toy vehicle 710 that is identified. When toy vehicle 710 is scanned and the tag on the vehicle 710 is identified, the vehicle is linked to a user's account and resides in the user's garage.

In addition, when a vehicle is scanned, the name 810 of the vehicle (in this case, Bone Shaker) and a virtual representation 820 of the toy vehicle 710 are shown. User interface 800 also displays a vehicle attribute section 830 that contains details on the toy vehicle, and an unlocked status indicator 840 that shows what content has been unlocked.

Figure 24:
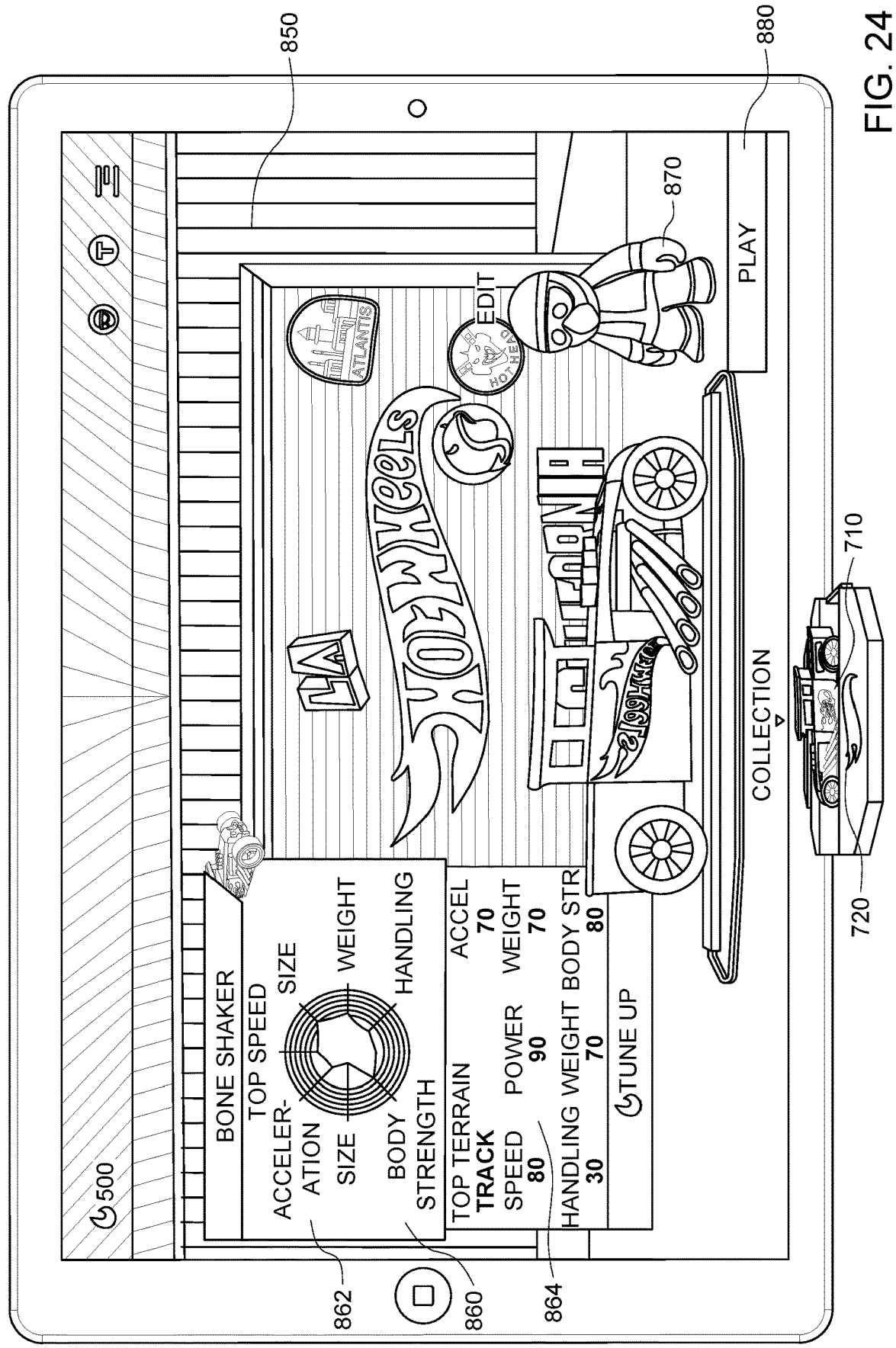

Referring to FIG. 24, another user interface 850 is illustrated. This interface 850 includes virtual representation of the toy vehicle 710 and an avatar 870 associated with the user. If a user wants to access an online game, the user can select the PLAY icon 880. At this interface 850, each user can manage the user's account and explore their collection.

On one part of the interface 850 is a car attribute panel 860. The top portion of panel 860 includes a graphical representation 862 of the features and attributes of the particular toy vehicle 710 that is detected by the reader 720. In this embodiment, the graphical representation includes the features of: size, acceleration, top speed, power, weight, handling, and body strength. In other embodiments, the features that are identified can vary.

The lower portion of the panel 860 includes numerical representations or scores 864 of features of the toy vehicle. In this embodiment, the "Top Terrain" for this toy vehicle is identified as track. In addition, acceleration is 70, speed is 80, power is 90, weight is 70, handling is 30, weight is 70, and body strength is 80. The graphical representation on panel 860 corresponds to the identified numerical scores. For different toy vehicles, the scores for the features will vary.

The combination of the attributes for a particular toy vehicle tailors the toy vehicle to be more suited to a particular challenge than another toy vehicle. For example, certain challenges may require higher amounts of power and speed than handling or body strength.

Figure 25:
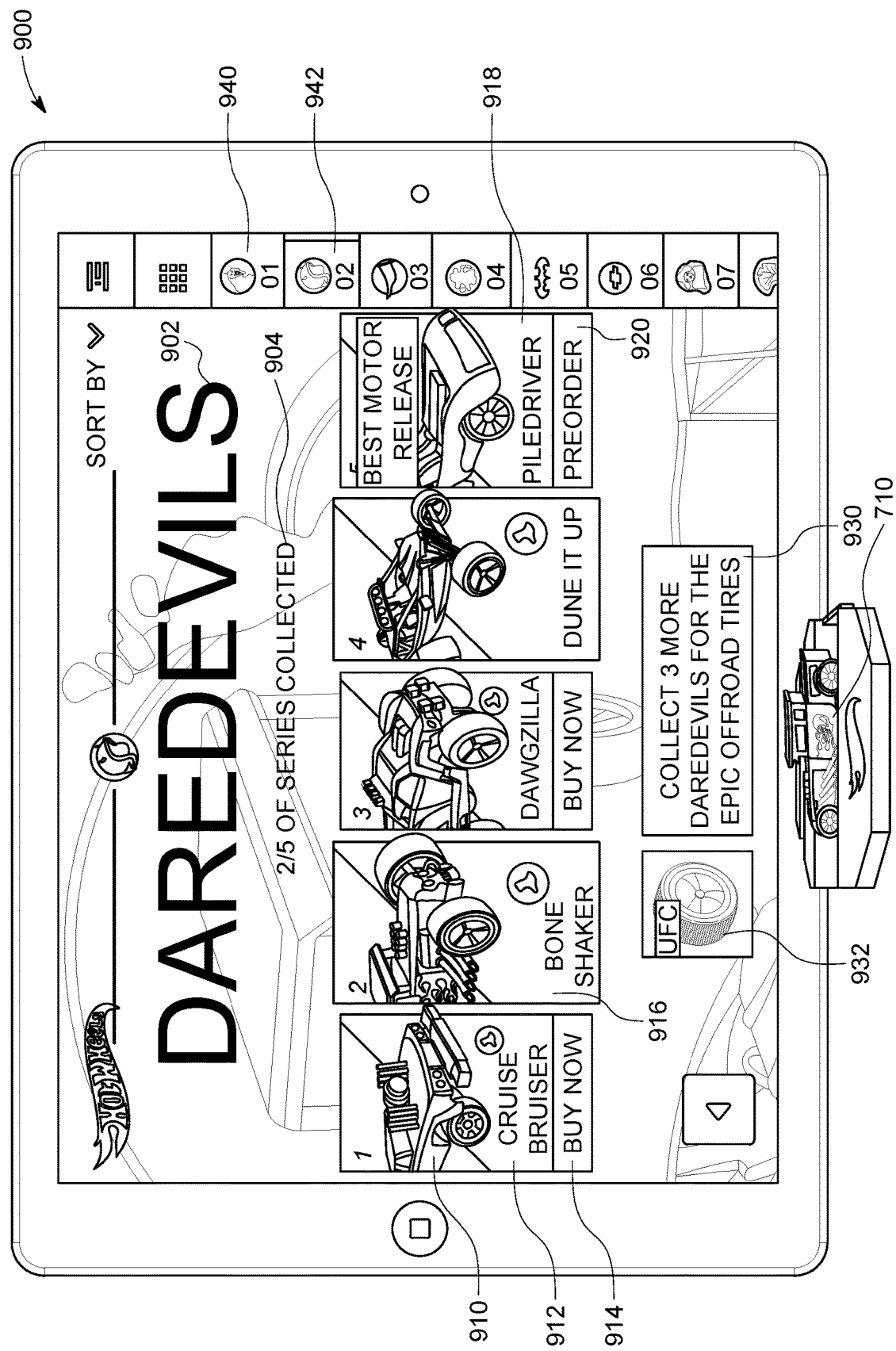

Referring to FIG. 25, another user interface 900 according to the present invention is illustrated. User interface 900 includes the name 902 of the collection, which in this example is DAREDEVILS, and the status 904 of the collection, which in this example is two out of five vehicles collected. A user can "collect" a toy vehicle in this online world by purchasing a toy vehicle and placing it on the reader, which identifies the toy vehicle based on the toy vehicle's tag.

User interface 900 includes a series 910 of toy vehicles that form part of this collection (namely, DAREDEVILS). The series 910 includes a virtual card or representation of the toy vehicles. As shown in FIG. 25, when a toy vehicle has been identified by the reader, the toy vehicle is registered in the memory of the reader. When the reader is wirelessly connected to the mobile device, the app running on the mobile device indicates that the particular toy vehicle has been collected by presenting the card or representation in full color instead of being shadowed. The card 912 for Cruise Bruiser is shadowed as opposed to the card 916 for Bone Shaker. Thus, the user has obtained the Bone Shaker toy vehicle and has not yet obtained the Cruise Bruiser toy vehicle. In addition, the Cruise Bruiser card 912 has a "Buy Now" link 914 that a user can select to go to a website that facilitates the purchase of the Cruise Bruiser toy vehicle.

Also in interface 900 is a toy vehicle card 918 that includes an indication 920 that has a "Preorder" option that can be selected by a user to order a product that is coming soon. When all of the toy vehicles in a collection have been obtained and identified by a reader, additional value and/or content can be unlocked. The vehicles in a collection can be released in a periodic manner that incentivizes users to go back to complete the collection and unlock exclusive rewards and/or content.

The user interface 900 also includes an incentive area 930 that provides information relating to the remaining actions for the collection. In this example, the information is that the user has to collect 3 more toy vehicles in this collection. The benefit of collecting all of the toy vehicles in a collection is shown in window 932, which in this example reflects offroad tires. The user interface 900 also includes a panel 940 that shows which items 942 have been collected so far.

Figure 26:
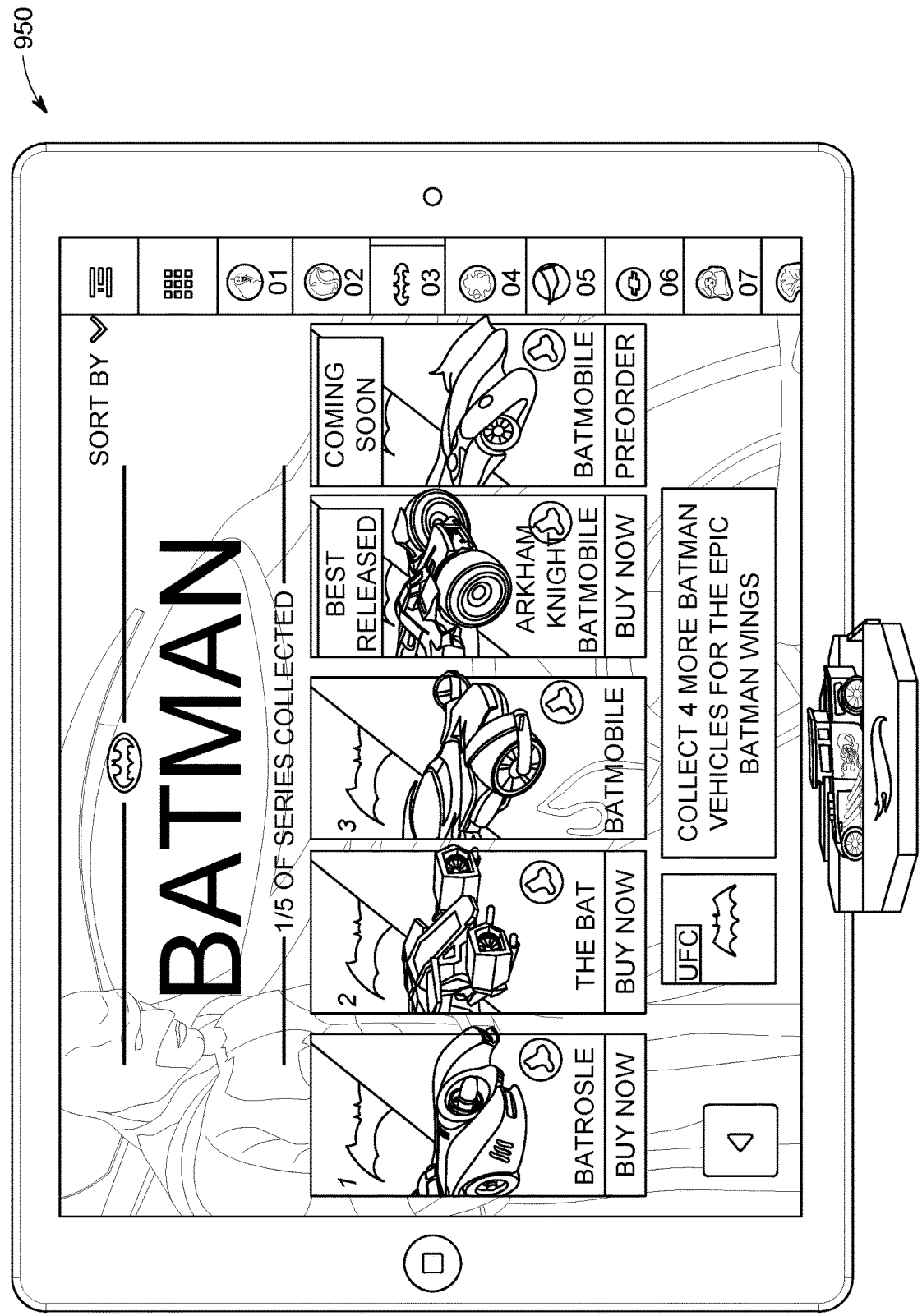

Referring to FIG. 26, another user interface 950 according to the present invention is illustrated. While this interface 950 relates to a different collection of toy vehicles, the types of information provided in interface 950 corresponds to the same types of information provided on interface 900.

Figure 27:
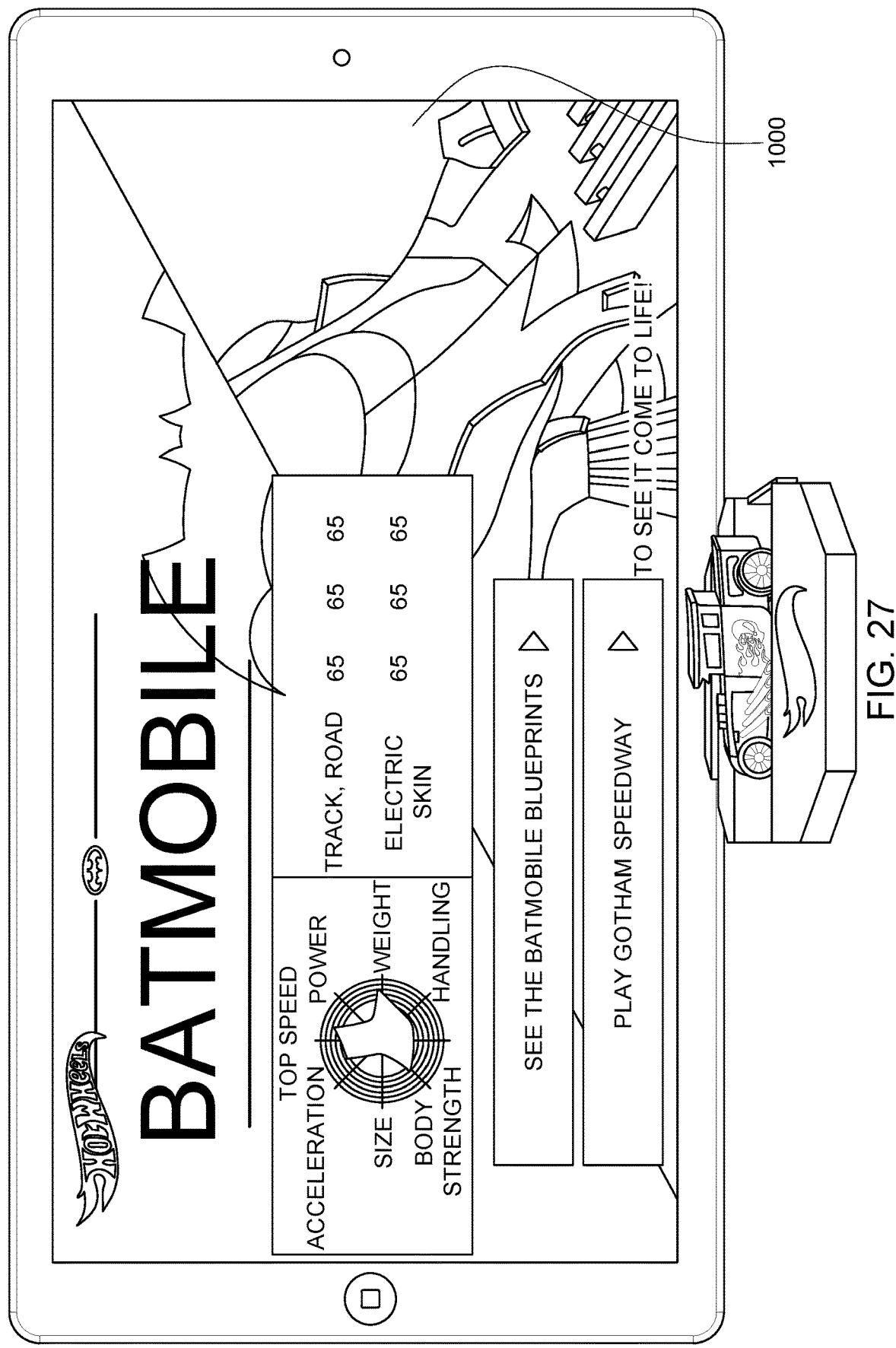
Figure 28:
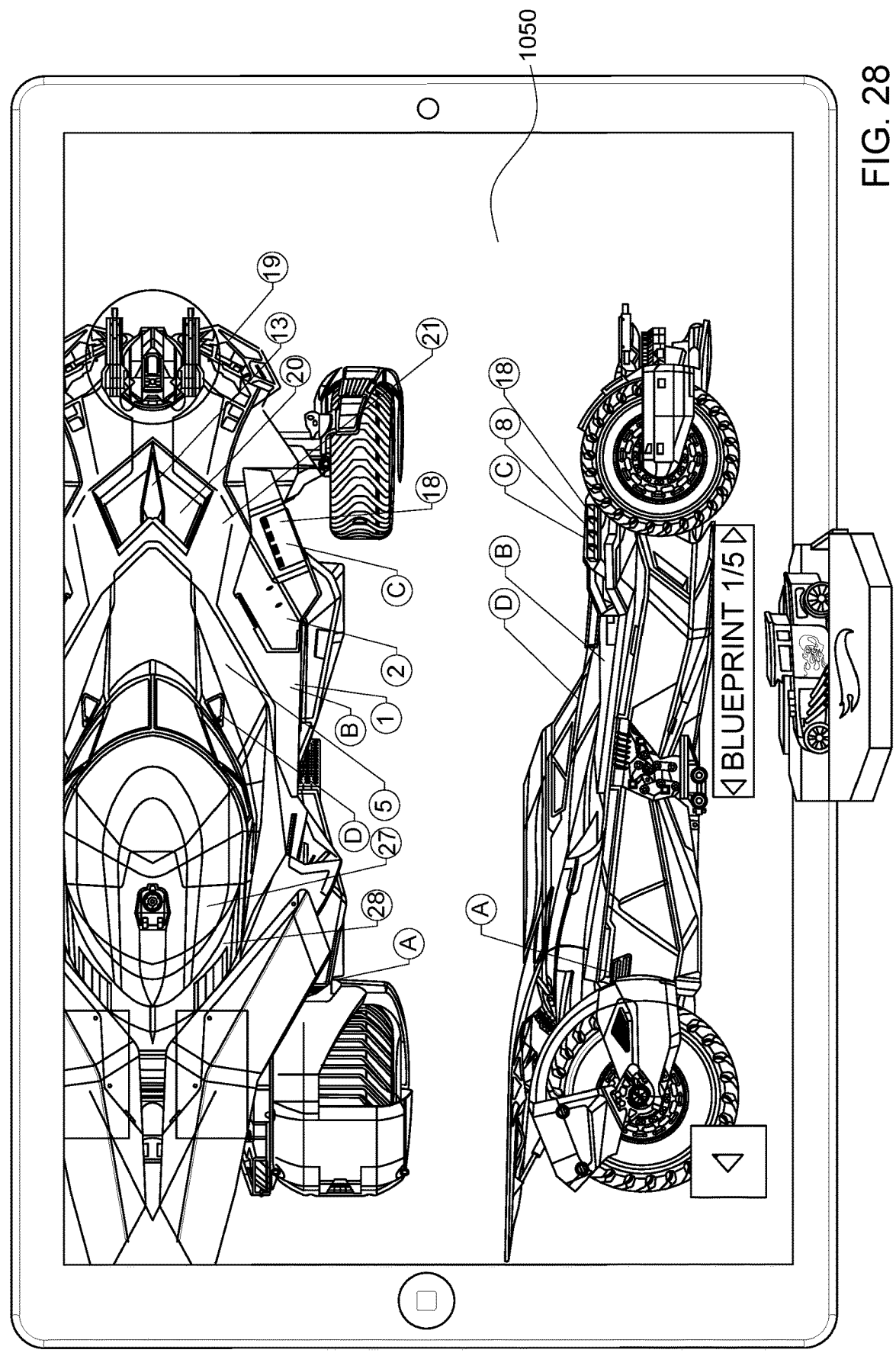

Users can explore their vehicle collection and exclusive content without having to play any digital games. Referring to FIGS. 27 and 28, content relating to a particular vehicle can be accessed by a user via interfaces 1000 and 1050.

Figure 29:
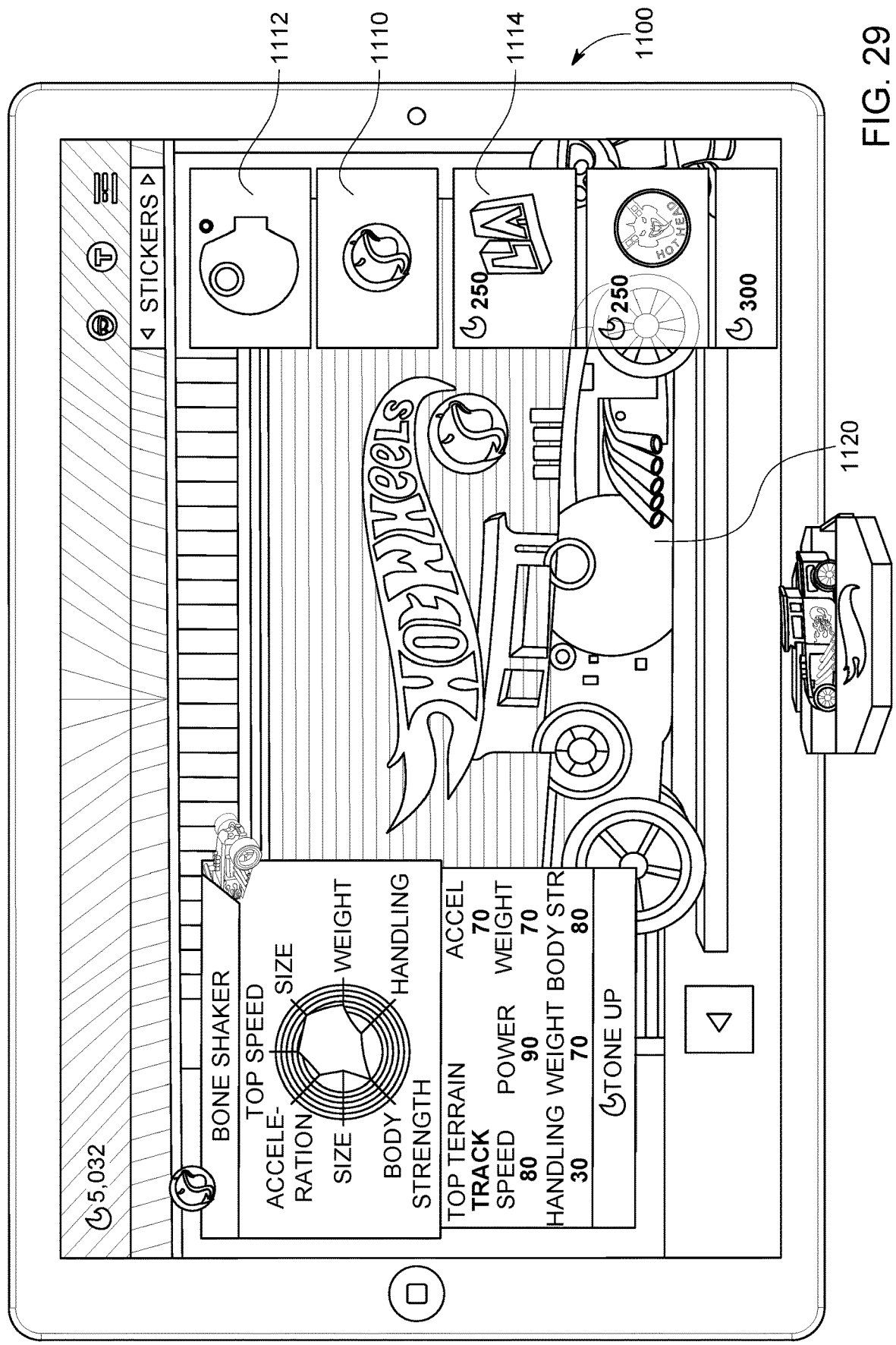

Referring to FIG. 29, another exemplary user interface 1100 is illustrated. Interface 1100 includes an accessory bar or area 1110 that provides virtual stickers that can be placed by a user on the virtual representation of toy vehicle 1120 to modify and change the appearance of the vehicle 1120. Some of the stickers 1112 have been purchased with in-game currency that has been either earned through play or purchased by the user. Others of the stickers 1114 need to be purchased after the user obtains a sufficient amount of in-game currency.

Figure 30:
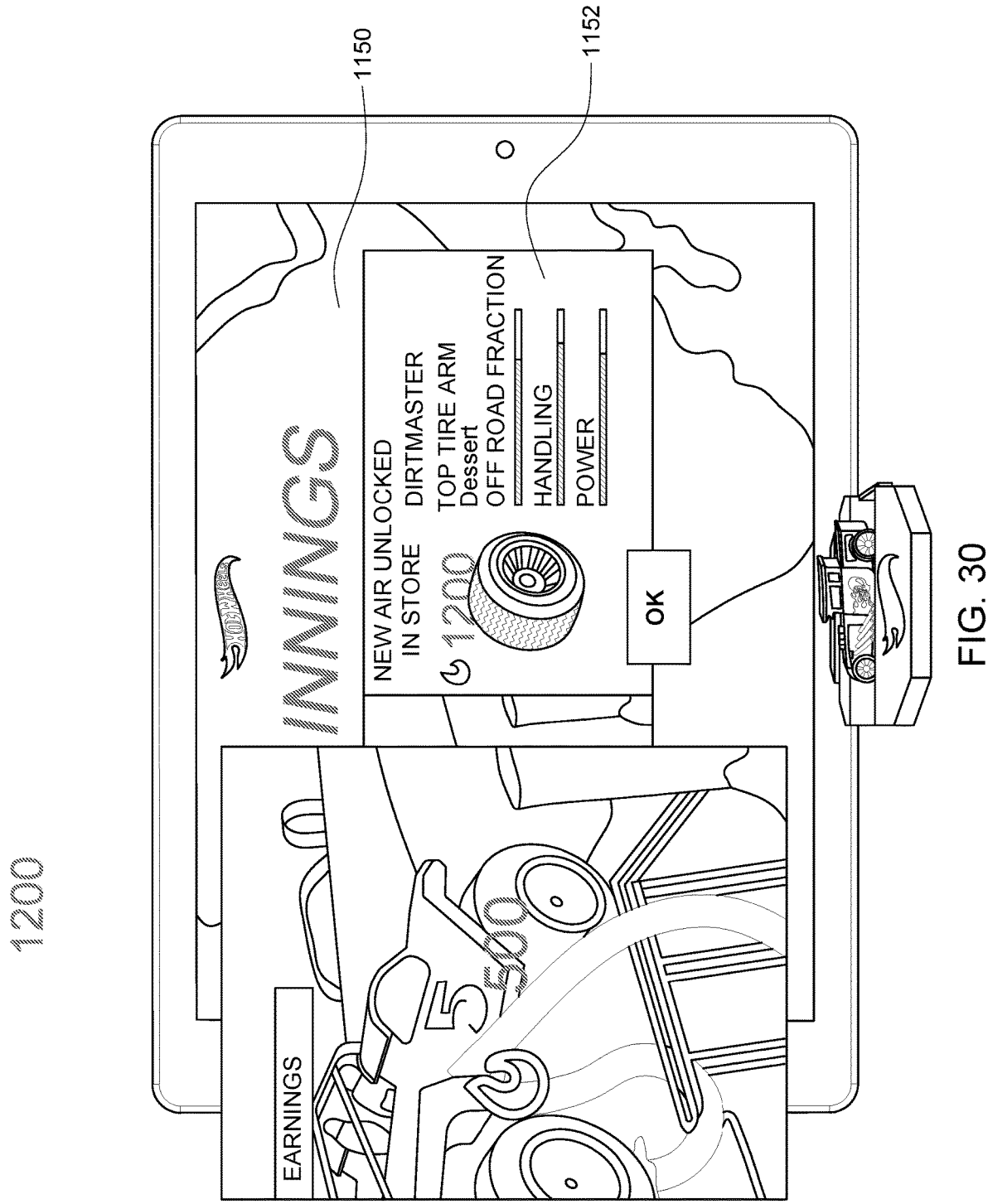

In FIG. 30, user interface 1150 includes details 1152 about a new virtual accessory that has been unlocked in the store. Players can either earn in-game currency by collecting vehicles, completing collections, and by competing in challenges. With the virtual currency, users can tune their cars, get themed parts, buy features for their avatars and garage, and pay to enter championships. Parts can be put on vehicles to modify how they look, change their stats, and/or unlock special abilities for certain game types.

Figure 31:
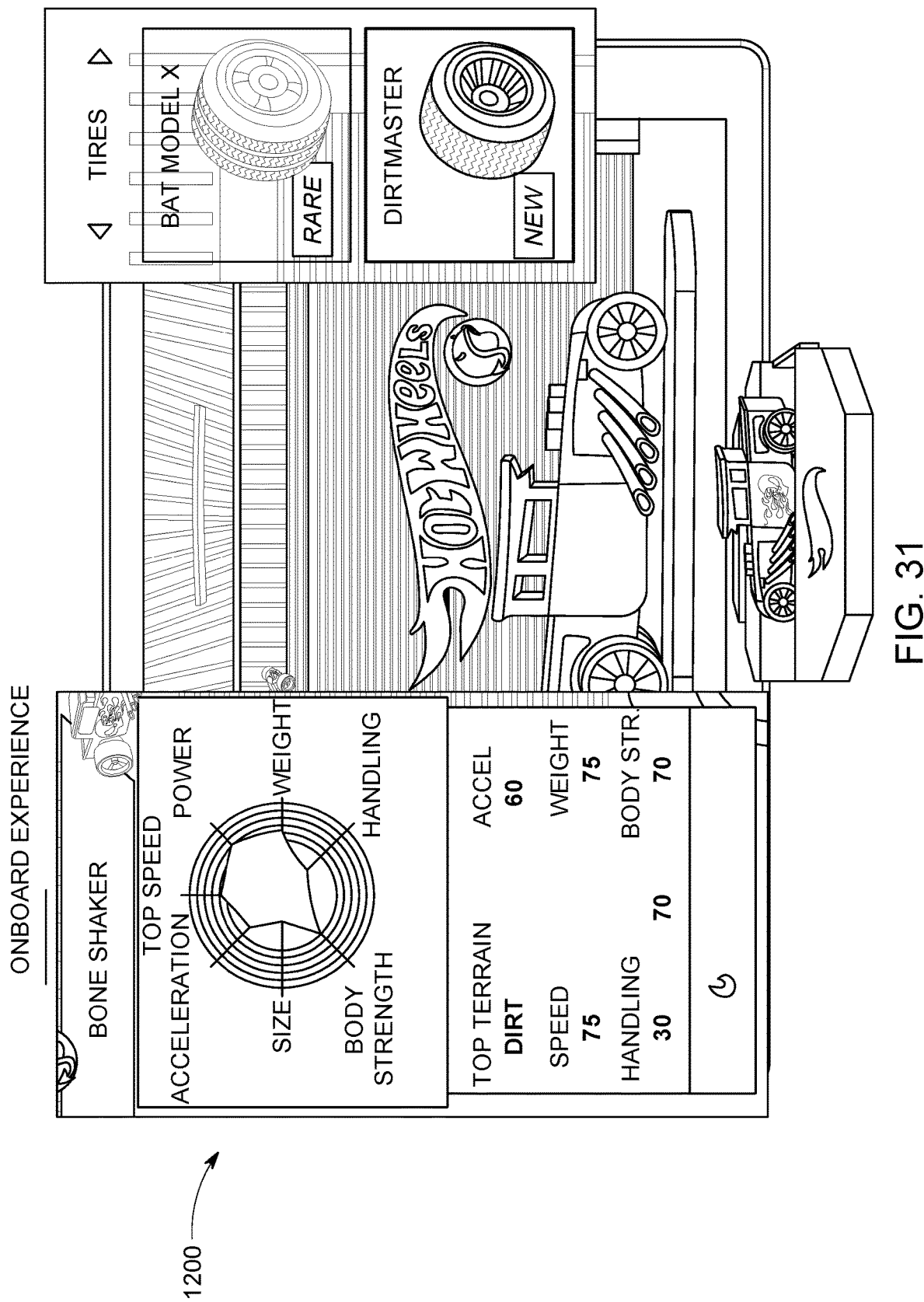

In one embodiment, the online platform may create treasure hunts for rare and super-rare vehicles that once scanned appear in a user's garage and deliver a range of possible enhancements and/or added value (soft currency, stickers, promotions, etc.). FIG. 31 shows a user interface 1200 that shows additional features of the virtual garage of a player.

Figure 32:
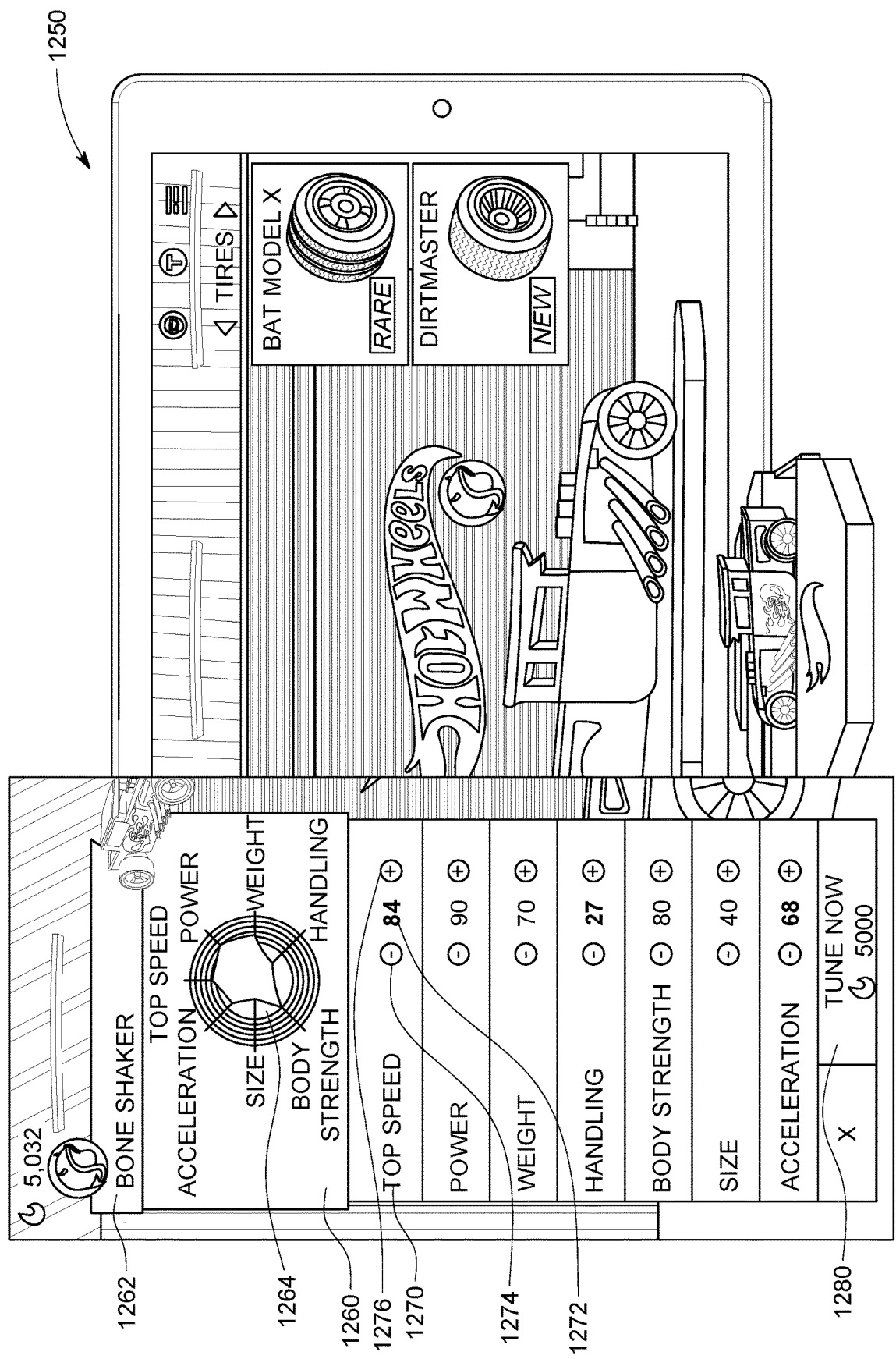

Referring to FIG. 32, another embodiment of a user interface is illustrated. User interface 1250 includes a panel 1260 that relates to the selected toy vehicle. By using earned or purchased in-game currency, users can fine-tune the stats of their vehicles to accomplish more nuanced challenges.

Panel 1260 has an upper portion that includes the name of the toy vehicle 1262 and a graphical representation 1264 of the features or attributes of the toy vehicle 1262. Panel 1260 also includes a lower portion that lists the features or attributes and the numerical value associated with each. In addition, lower portion provides the user with the ability to adjust the numerical values if a satisfactory amount of in-game or virtual currency has been paid by the user.

For example, attribute "Top Speed" 1270 is currently at a value 1272 of 84, but can be decreased by a user via the decrease button 1274 and increased by a user via the increase button 1276. The decreasing and increasing of a numeric value can be referred to as "tuning" the toy vehicle and the particular amount of currency needed to either decrease or increase the value is shown in the actuator button 1280. Each of the other attributes can be similarly adjusted provided the user has sufficient currency.

Figure 33:
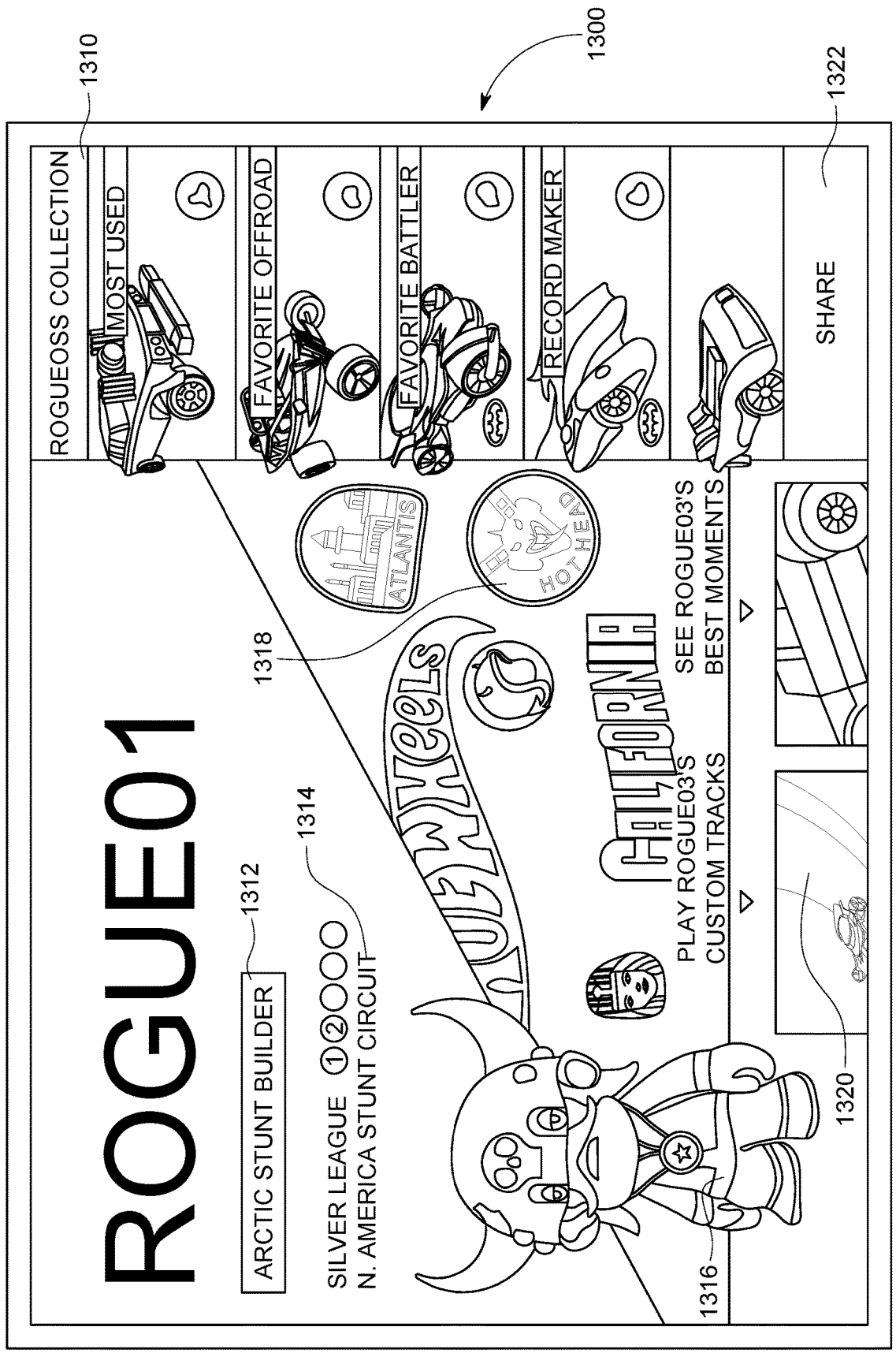

FIG. 33 illustrates another user interface according to the present invention. In this interface 1300, a player's avatar and garage are displayed to show others what the player has accomplished and created. For example, interface 1300 includes a panel 1310 that shows a player's collection of toy vehicles, including which of the vehicles is the most used and any favorites. Interface 1300 also includes a custom title 1312 depending on what challenges have been completed and a designation 1314 as to what championship rankings for the player. The interface 1300 includes an avatar 1316 that can be decorated and garage stickers 1318 that show where the player has been victorious. Video content is provided to show off player-build challenges and replays 1320. User interface 1300 can be shared with others via button 1322.

Figure 34:
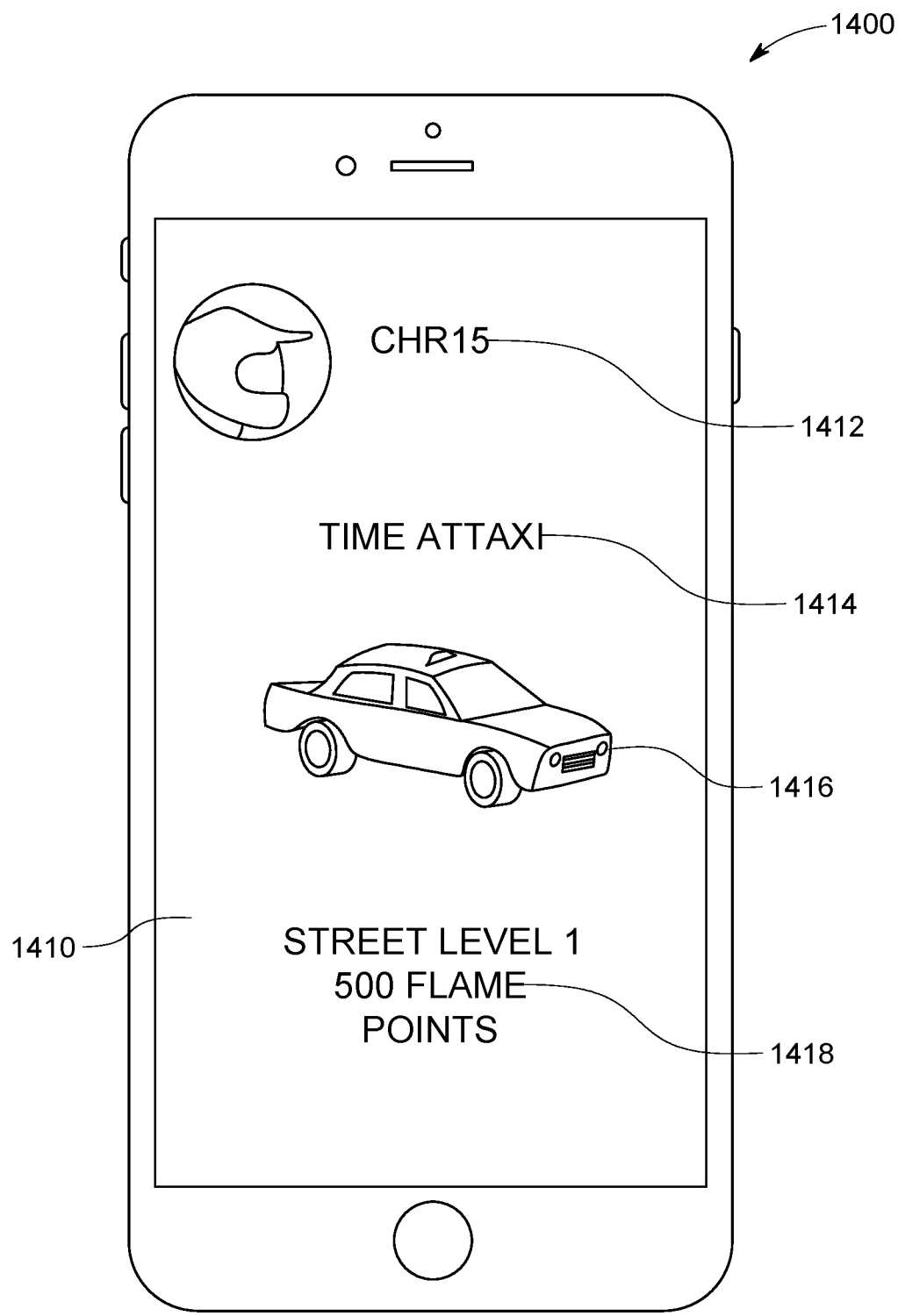
FIGS. 34-40 illustrate several additional user interfaces from the virtual online environment according to the present invention.
Figure 35:
Figure 36:
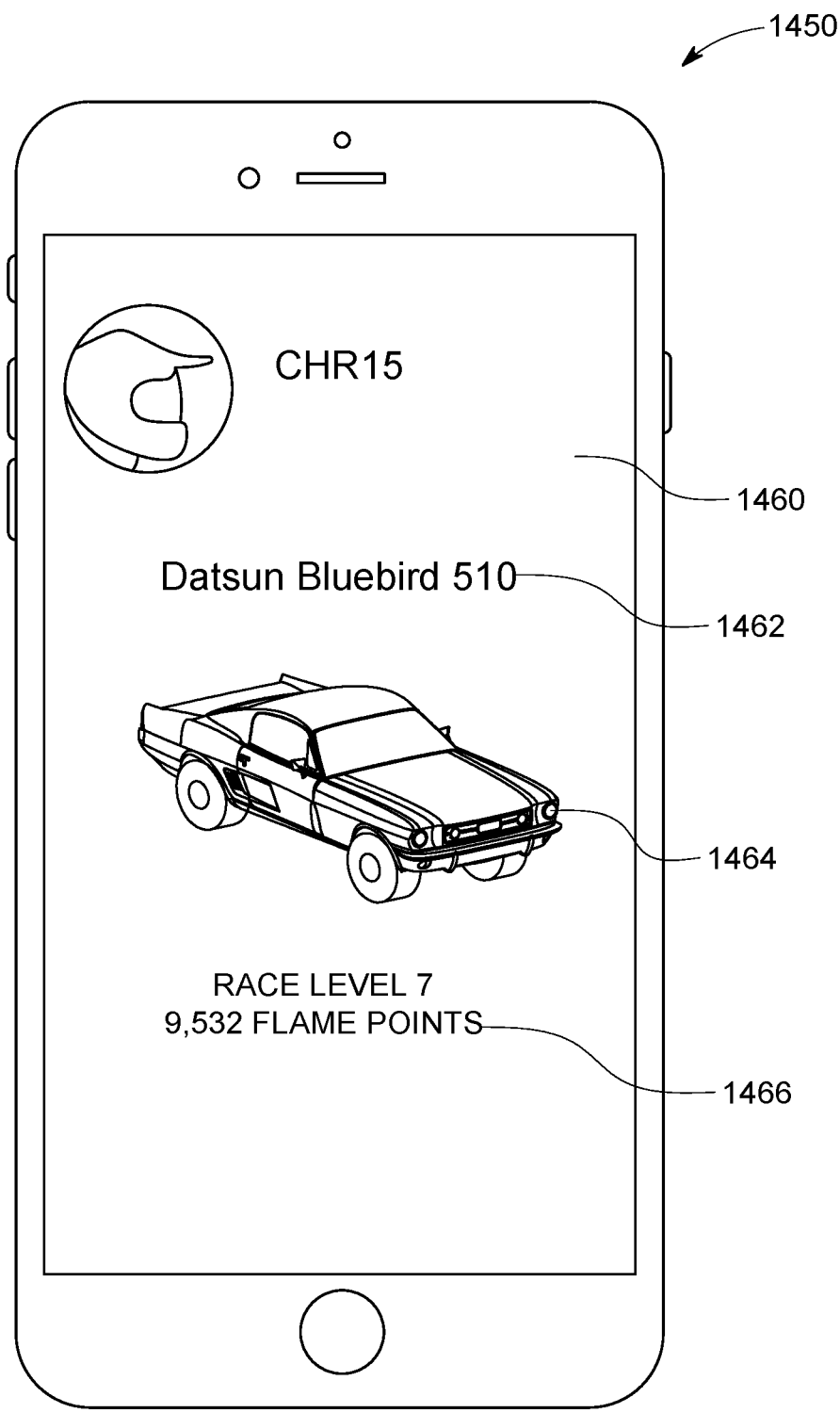

Referring to FIGS. 34-36, a mobile device 1400 is illustrated with exemplary screens or interfaces 1410 according to an embodiment of the invention. In FIG. 34, interface 1410 includes the user's name 1412, the name of the toy vehicle 1414, a virtual representation of the vehicle 1416, and the level 1418 of the vehicle in the online world. In FIG. 35, interface 1430 includes additional details 1432 about the toy vehicle. Some exemplary details include vehicle stats and history.

Referring to FIG. 36, a mobile device 1450 is illustrated with an exemplary interface 1460 that shows a different toy vehicle name 1462, a different toy vehicle 1464, and different toy vehicle details 1466 than those shown in FIGS. 34-35. The user's name is the same in FIGS. 34 and 36.

Figure 37:
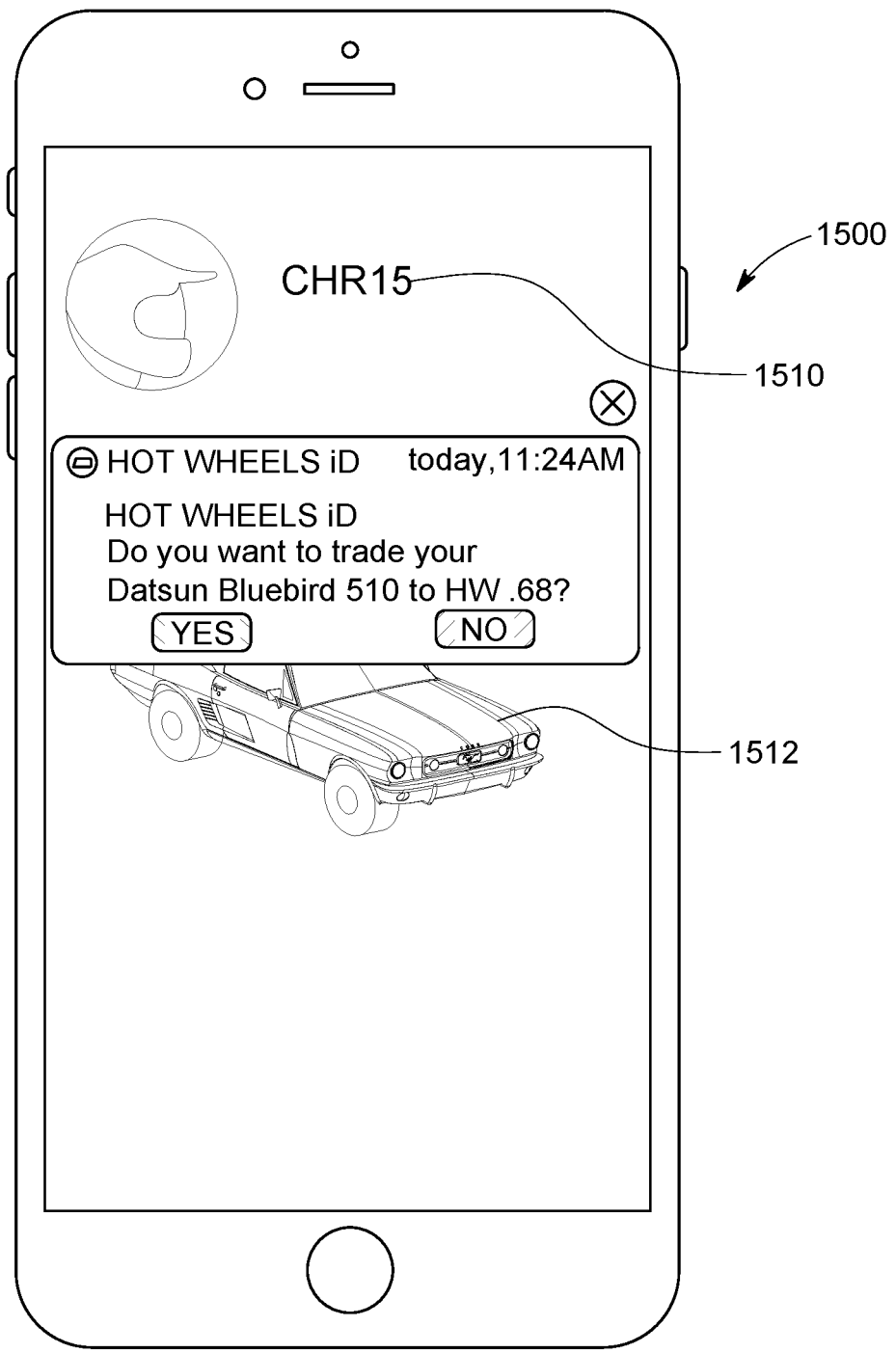
Figure 38:
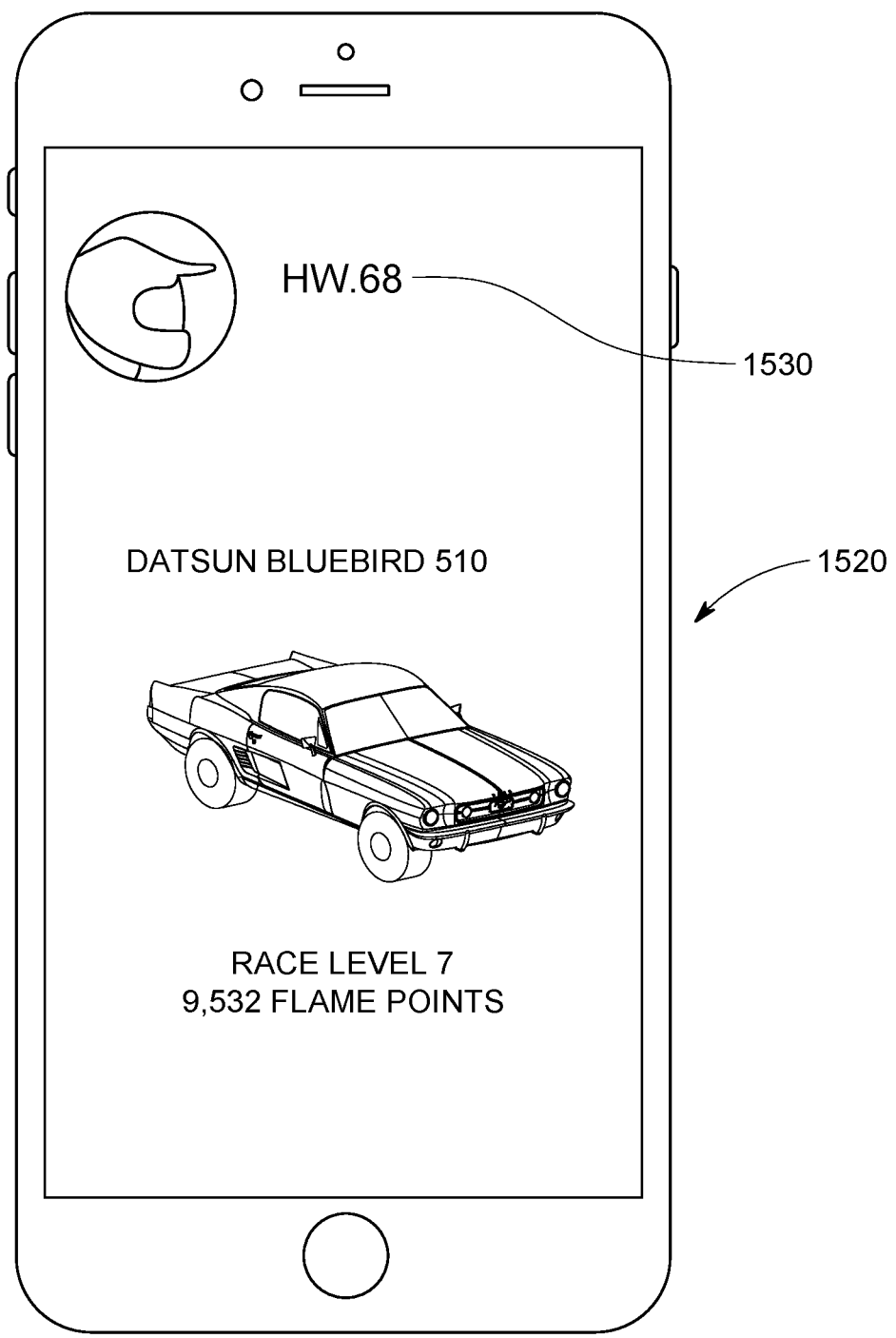
Figure 39:
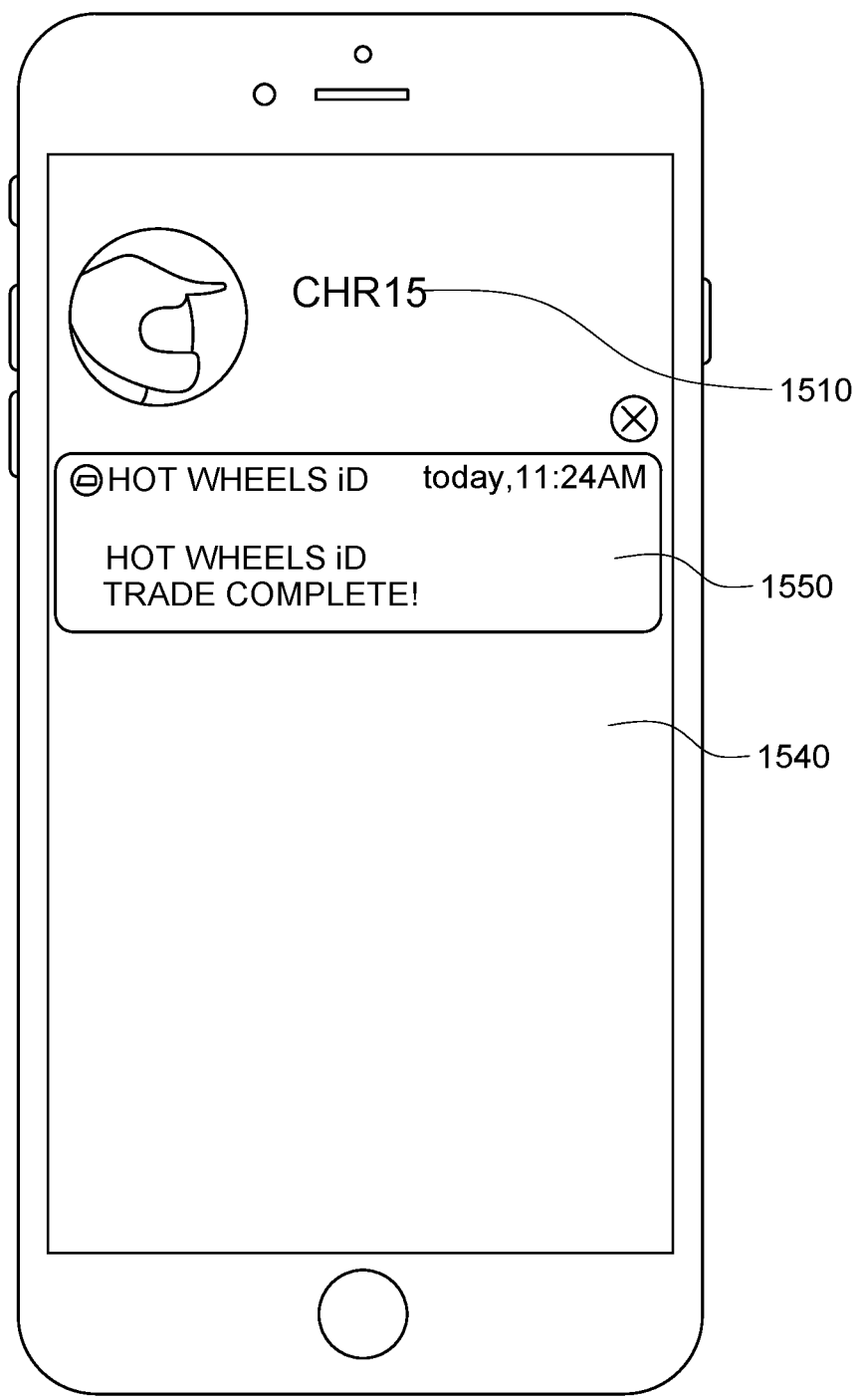
Figure 40:
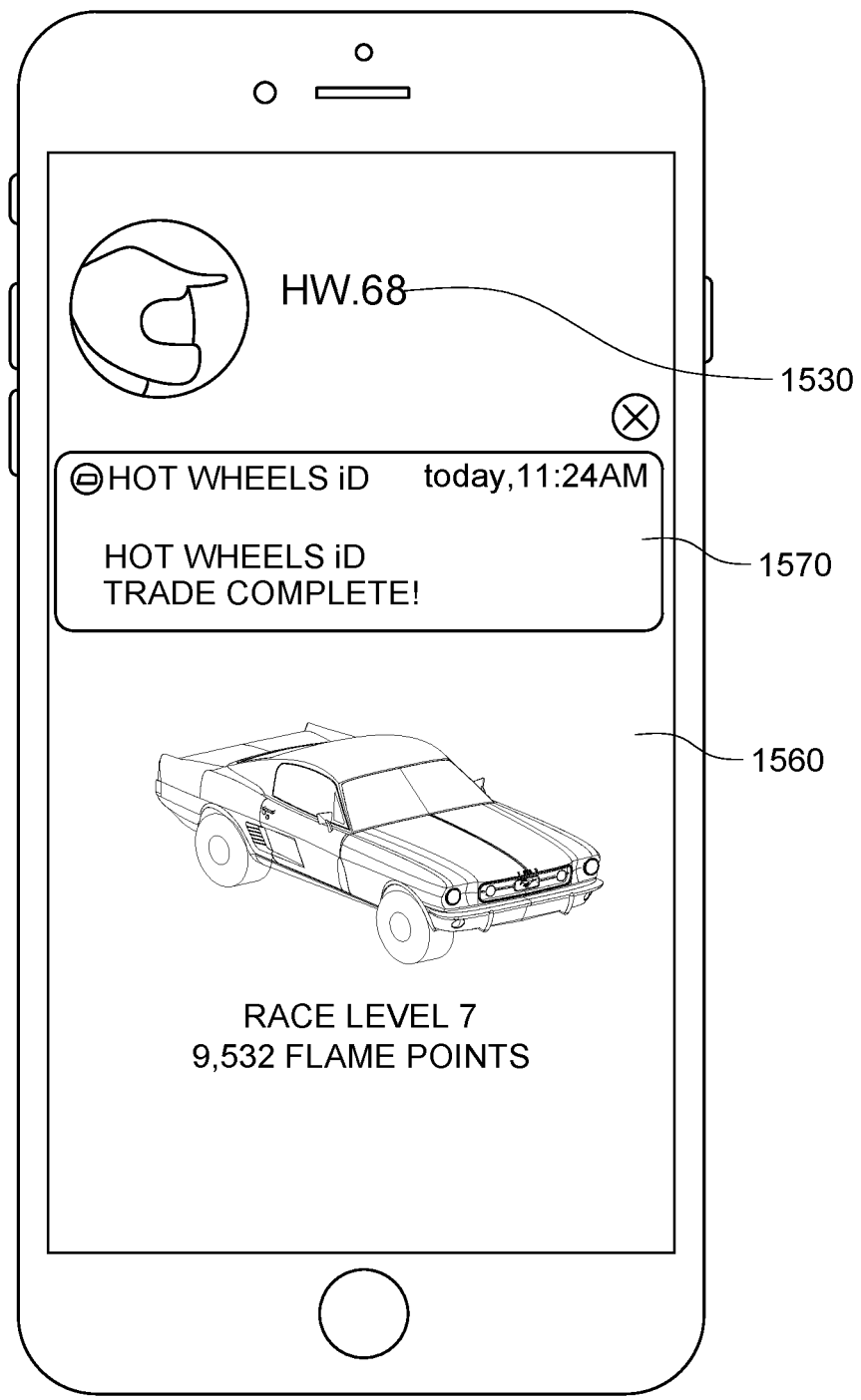

FIGS. 37-40 illustrate different user interfaces according to an embodiment of the invention. In these interfaces, some of the steps relating to a trade between two users are shown. In FIG. 37, interface 1500 is for user 1510 and relates to a potential trade of a virtual toy vehicle. In particular, message 1512 proposes the trade question to user 1510. The other user 1530 in the trade can see interface 1520 on user's 1530 mobile device (see FIG. 38).

If user 1510 selects YES to the question 1512 in FIG. 37, message 1550 confirming the trade is shown to user 1510 in interface 1540. Likewise, user 1530 sees message 1570 in interface 1560 that confirms that the trade is complete.

In another embodiment of the invention, targeted campaigns may be used to direct users to certain stores to purchase particular toy vehicles.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A toy system, comprising:
   a toy vehicle including a Near Field Communications (NFC) tag with a unique identification associated with the toy vehicle; and
   a toy vehicle accessory having an electronic system comprising an NFC reader that is used to communicate with the NFC tag of the toy vehicle to determine the unique identification, the electronic system including a wireless communication component configured to communicate the unique identification to a mobile device that is usable independently from the toy vehicle accessory, the toy vehicle accessory having a housing and a movable portion removably coupleable to the housing, the movable portion including the NFC reader.

2. The toy system of claim 1, wherein the movable portion includes the wireless communication component.

3. The toy system of claim 1, wherein the NFC tag is embedded within a chassis of the toy vehicle.

4. The toy system of claim 3, wherein the NFC tag comprises:
   a flexible substrate; and
   a chip and an antenna that are coupled to the flexible substrate, the antenna being wound into a particular pattern along the flexible substrate.

5. The toy system of claim 1, wherein the toy vehicle accessory further comprises:
   an infrared (IR) sensor system configured to determine a speed of the toy vehicle when the toy vehicle passes the toy vehicle accessory.

6. The toy system of claim 1, wherein the toy vehicle accessory further comprises:
   an output system configured to output at least one of visual outputs or audible outputs in response to a determination of the unique identification of the toy vehicle.

7. The toy system of claim 1, wherein the toy vehicle accessory further comprises:
   a holding portion that can move between a closed position and an open position to support the mobile device adjacent the movable portion.

8. The toy system of claim 1, wherein the toy vehicle accessory further comprises:
   a track portion that includes a bottom along which the toy vehicle can travel, the bottom being bounded by opposing sidewalls.

9. The toy system of claim 8, wherein the movable portion defines a central section of the track portion and the housing defines portions of the track portion extending from either side of the central section.

10. The toy system of claim 1, wherein the housing comprises:
    a first side portion and a second side portion; and
    a connecting portion disposed between the first side portion and the second side portion, the movable portion being removably coupleable to the connecting portion.

11. The toy system of claim 1, wherein the mobile device is configured to execute a digital platform configured to:
    generate a digital representation of the toy vehicle based on the unique identification communicated to the mobile device by the wireless communication component; and
    display the digital representation in a graphical user interface that allows a user to interact with the digital representation.

12. The toy system of claim 11, wherein the graphical user interface is customized based on the unique identification.

13. The toy system of claim 11, wherein the digital platform is further configured to:
    generate a set of attributes for the digital representation of the toy vehicle based on the unique identification;
    adjust the set of attributes based on at least one of user inputs or digital accessories added to the digital representation; and
    associate an adjusted set of attributes with the digital representation for any future play.

14. A toy system, comprising:
    a toy including a Near Field Communications (NFC) tag with a unique identification associated with the toy; and
    a toy accessory having an electronic system comprising an NFC reader that is used to communicate with the NFC tag of the toy to determine the unique identification, the electronic system including a wireless communication component configured to communicate the unique identification to a mobile device that is usable independently from the toy accessory, the toy accessory having a housing and a movable portion removably coupleable to the housing, the movable portion including the NFC reader.

15. The toy system of claim 14, wherein the toy accessory further comprises:
    a holding portion that can move between a closed position and an open position to support the mobile device adjacent the movable portion.

16. The toy system of claim 14, wherein the mobile device is configured to execute a digital platform configured to:
    generate a digital representation of the toy based on the unique identification communicated to the mobile device by the wireless communication component; and
    display the digital representation in a graphical user interface that allows a user to interact with the digital representation, the graphical user interface being customized based on the unique identification.

17. The toy system of claim 14, wherein the movable portion includes the wireless communication component.

18. A toy system, comprising:
    a toy including a Near Field Communications (NFC) tag with a unique identification associated with the toy; and
    a toy accessory comprising:

an electronic system including an NFC reader that is used to communicate with the NFC tag of the toy to determine the unique identification, and a communication component configured to communicate the unique identification to a mobile device; and a holding portion that can move between a closed position and an open position to support the mobile device.

19. The toy system of claim 18, wherein the mobile device is configured to execute a digital platform configured to:

generate a digital representation of the toy based on the unique identification communicated to the mobile device by the communication component; and display the digital representation in a graphical user interface that allows a user to interact with the digital representation, the graphical user interface being customized based on the unique identification.

20. The toy system of claim 18, wherein the toy accessory further comprises:

a housing; and a movable portion removably coupleable to the housing, the movable portion including the NFC reader.

* * * * *